United States Patent [19]
Iwahori et al.

[11] Patent Number: 6,108,225
[45] Date of Patent: *Aug. 22, 2000

[54] POWER DEVICE WITH COMMONLY USED SWITCHING ELEMENTS

[75] Inventors: Yutaka Iwahori, Kadoma; Hiroichi Shinbori, Kobe; Tsutomu Shiomi, Nara; Toshiaki Nakamura, Kadoma; Shinji Hizuma, Ibaraki, all of Japan

[73] Assignee: Matsushita Electric Works, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/113,322

[22] Filed: Jul. 10, 1998

[30] Foreign Application Priority Data

| Aug. 26, 1997 | [JP] | Japan | 9-229937 |
| Aug. 26, 1997 | [JP] | Japan | 9-230083 |
| Sep. 12, 1997 | [JP] | Japan | 9-249173 |

[51] Int. Cl.$^7$ .............. H02M 5/45; H02M 3/24; H02M 7/5387
[52] U.S. Cl. ............... 363/98; 363/37; 363/132
[58] Field of Search ................. 363/37, 80, 98, 363/124, 132

[56] References Cited

U.S. PATENT DOCUMENTS

| 4,949,016 | 8/1990 | De Bijl et al. | 363/37 |
| 5,063,490 | 11/1991 | Maehara et al. | 315/208 |
| 5,315,497 | 5/1994 | Severinsky | 363/37 |
| 5,345,377 | 9/1994 | Edwards | 363/40 |
| 5,402,060 | 3/1995 | Erishman | 323/268 |
| 5,410,467 | 4/1995 | Smith et al. | 363/16 |
| 5,594,635 | 1/1997 | Gegner | 363/17 |
| 5,734,258 | 3/1998 | Esser | 323/224 |

FOREIGN PATENT DOCUMENTS

| WO98/10509 | 3/1998 | WIPO | H02M 7/48 |

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

A power device includes at least two power conversion circuits respectively having at least one of switching elements, at least one of which switching elements in these conversion circuits being used in common as an element constituting the at least two different power conversion circuits, a control device providing at least a period in which at least one of currents flowing from at least one of the different power conversion circuits to the commonly used switching element has a polarity inverse to at least the other one of the currents flowing from at least the other one of the power conversion circuits, so as to cancel each other, and a unit for detecting the state of the respective conversion circuits. The operation of the switching elements is thereby made modifiable in accordance with a lowering in the resistance of a load of the device, and the withstand voltage of the elements can be prevented effectively from rising even upon any fluctuation in the load.

9 Claims, 24 Drawing Sheets

POWER DEVICE WITH COMMONLY USED SWITCHING ELEMENTS

BACKGROUND OF THE INVENTION

This invention relates to a power device in which a plurality of switching circuits for power conversion employ in common a switching element.

DESCRIPTION OF RELATED ART

Various types of the power devices of this kind have been suggested, an example of which is disclosed in U.S. Pat. No. 4,949,016 wherein an arrangement is made to reduce a distortion in input current waveform while applying to a load an AC voltage by means of a combination of a boost converter and an inverter.

Further, in U.S. Pat. No. 5,063,490, there has been disclosed an arrangement of a boost converter and a low frequency inverter, wherein the switching elements in both of the boost converter and the lower frequency inverter are used in common, so that required number of the switching elements can be reduced and a low frequency square wave output can be applied to a laod.

In addition to U.S. Pat. No. 5,063,490, further, WO98/10509 discloses an arrangement for reducing any loss in the switching elements.

For easier appreciation of the present invention, references shall be made in the followings to the prior art with reference to accompanying drawings.

In FIG. 1, a circuit arrangement of a well known power device is shown, in which a series circuit of first and second field effect transistors Q1 and Q2, a series circuit of third and fourth field effect transistors Q3 and Q4 and a series circuit of two rectifying elements D5 and D6 are connected in parallel to a capacitor EC, a series circuit of a power source AC and first inductor L1 is connected between a node of the first and second field effect transistors Q1 and Q2 and a node of the two rectifying elements D5 and D6, and a series circuit of a load circuit L and second inductor L2 is connected between the node of the first and second field effect transistors Q1 and Q2 and a node of the third and fourth field effect transistors Q3 and Q4. An end of the power source AC is connected to coincide with the node between the first and second field effect transistors Q1 and Q2, and an end of the load circuit L is connected to coincide also with the same node between the first and second field effect transistors Q1 and Q2.

The respective field effect transistors Q1 through Q4 are driven for switching operation as described in the followings by ON and OFF signals provided from a control means CNT. That is, when the polarity of the source AC is negative on the side of the node between the first and second transistors Q1 and Q2 as shown in FIGS. 2a–2c, first, the operation occurs in the sequence of a period in which the second and third transistors Q2 and Q3 are made ON (see FIG. 2a), a period in which the first and third transistors Q1 and Q3 are made ON (see FIG. 2b), and a period in which the first to fourth transistors Q1–Q4 are made OFF (see FIG. 2c), whereas, when the polarity of the source AC is positive on the side of the node between the first and second transistors Q1 and Q2 as shown in FIGS. 3a–3c, next, the operation occurs in the sequence of a period in which the first and fourth transistors Q1 and Q4 are made ON (see FIG. 3a), a period in which the second and fourth transistors Q2 and Q4 are made ON, and a period in which the first through fourth transistors Q1–Q4 are made OFF (see FIG. 3c).

Such power device as in the above is constituted by a first power conversion circuit forming a boost converter and a second power conversion circuit forming a buck converter, and the first and second field effect transistors Q1 and Q2 are used in common as part of the first and second power conversion circuits. The operation in the state when the polarity of the source AC is negative on the side of the node of the first and second transistors Q1 and Q2 such as shown in FIGS. 2a–2c shall be described with respect to the first power conversion circuit forming the boost converter and the second power conversion circuit forming the buck converter.

Referring initially to the first power conversion circuit forming the boost converter, the period in which the first and third field effect transistors Q1 and Q3 are made ON (FIG. 2b) causes an energy charged in the inductor L1, and the period in which the first through fourth field effect transistors Q1–Q4 are made OFF (FIG. 2c) as well as the period in which the second and third transistors Q2 and Q3 are made ON (FIG. 2a) cause the energy stored in the first inductor L1 discharged.

Referring next to the second power conversion circuit forming the buck converter, the period in which the second and third transistors Q2 and Q3 are made ON (FIG. 2a) causes an energy charged in the second inductor L2, whereas the period in which the first and third transistors Q1 and Q3 are made ON (FIG. 2b) as well as the period in which the first through fourth transistors Q1–Q4 are made OFF (FIG. 2c) cause the energy stored in the second inductor L2 discharged.

Describing the above with an attention paid to the loop of current, the period in which the second and third transistors Q2 and Q3 are made ON (FIG. 2a) is a term (which shall be referred to as T1) in which a state where a current of the first power conversion circuit CNV1 forms a closed loop including the first inductor L1, first rectifying element D5, capacitor EC, second transistor Q2 and power source AC as well as a state where a current of the second power conversion circuit CNV2 forms a closed loop including the capacitor EC, third transistor Q3, second inductor L2, load circuit L and second transistor Q2 are simultaneously satisfied. Further, the period in which the first and third transistors Q1 and Q3 are made ON (FIG. 2b) is a term (which shall be referred to as T2) in which a state where the current of the first power conversion circuit CNV1 forms a closed loop including the source AC, first inductor L1, first rectifying element D5 and first transistor Q1 as well as a state where the current of the second power conversion circuit CNV2 forms a closed loop including the second inductor L2, load circuit L and first and third transistors Q1 and Q3 are simultaneously satisfied. Still further, the period in which the first through fourth transistors Q1–Q4 are all turned OFF (FIG. 2c) is a term (which shall be referred to as T3) in which a state where the current of the first power conversion circuit CNV1 forms a closed loop including the first inductor L1, first rectifying element D5, capacitor EC, second transistor Q2 and source AC as well as a state where the current of the second power conversion circuit CNV2 forms a closed loop including the second inductor L2, load circuit L, second transistor Q2 and fourth transistor Q4 are simultaneously satisfied.

Since, as will be clear from the above description, an input current to this power device can be controlled mainly in the term T2, it will be possible to control to some extent an input power by adjusting the length of the term T2 as shown by dotted lines in FIGS. 4a and 4b, wherein FIG. 4a showing a period in which the one end of the source AC is at the positive polarity and FIG. 4b showing a period in which the one end of the source AC is at the negative polarity. That is, it is enabled to keep the voltage across the capacitor EC at a proper value by adjusting the term T2.

The operation in the event of the inverse polarity of the source AC has been shown also in FIGS. 3a–3c, and current and signal waveforms at respective parts in the device are shown in FIG. 5, in which there are shown a current IL1 flowing to the first inductor L1, a current IL2 flowing to the second inductor L2, a difference IL2–IL1 of both currents to the inductors L2 and L1, a current IQ1 flowing to the first field effect transistor Q1, a current IQ2 flowing to the second transistor Q2, a current IQ3 flowing to the third transistor Q3, a current IQ4 flowing to the fourth transistor Q4, and driving signals VQ1GS–VQ4GS respectively supplied across the gate and source electrodes of the respective first through fourth transistors Q1–Q4. FIG. 5 shows the waveforms for one switching cycle, in which a term t0–t1 corresponds to the term T1, a term t1–t2 corresponds to the term T2, and a term t2–t3 (=t0) corresponds to the term T3.

It is assumed in the foregoing inverter circuit that a load impedance has been remarkably lowered (which shall be referred to as "upon short-circuit" in the followings). References shall be made to the current loops when the polarity of the source AC is negative on the side of the node of the first and second transistors Q1 and Q2, as shown in FIGS. 6a–6d. First, a term for which the second and third transistors Q2 and Q3 are made ON (FIG. 6a) is the term T1 in which a state where the current of the second power conversion circuit CNV2 forms a closed loop comprising the capacitor EC, third transistor Q3, second inductor L2, load circuit L and second transistor Q2 is satisfied. Next, a period in which the first and third transistors Q1 and Q3 are made ON (FIG. 6b) is the term T2 in which a state where the current of the first power conversion circuit CNV1 forms a closed loop comprising the source AC, first inductor L1, first rectifying element D5 and first transistor Q1 as well as a state where the current of the second power conversion circuit CNV2 forms a closed loop comprising the second inductor L2, load circuit L, first transistor Q1 and third transistor Q3 are simultaneously satisfied. In the period for which the first through fourth field effect transistors Q1–Q4 are all made OFF (FIG. 6c or 6d), on the other hand, there exist such two states as in the followings, depending on the relationship in magnitude between the currents flowing to the first and second inductors L1 and L2.

In an event where the absolute value of the current to the first inductor L1 is smaller than that of the current to the second inductor L2 (FIG. 6c), it occurs the term T3 in which a state where the current of the first power conversion circuit CNV1 forms a closed loop comprising the source AC, first inductor L1, first rectifying element D5 and first transistor Q1 as well as a state where the current of the second power conversion circuit CNV2 forms a closed loop comprising the second inductor L2, load circuit L, first transistor Q1, capacitor EC and fourth transistor Q4 are simultaneously satisfied. Further, when the absolute value of the current of the first inductor L1 coincides with the absolute value of the current of the second inductor L2 (FIG. 6d), the currents from the first and second power conversion circuits CNV1 and CNV2 are mutually cancelled, consequent to which the sum total of the currents flowing into the switching elements used in common will be zero, no closed loop of current through the commonly used switching elements is formed within the respective power conversion circuits in practice, and it becomes a term (which shall be referred to as T4) in which a state of forming a closed loop comprising the first inductor L1, first rectifying element D5, capacitor EC, fourth transistor Q4, second inductor L2, load circuit L and source AC is satisfied.

Describing the foregoing terms T1–T4 with reference to the first power conversion circuit forming the boost converter and the second power conversion circuit forming the buck converter, the terms T2 and T3 with reference to the first power conversion circuit are for having an energy charged in the first inductor L1, while the term T4 is for having the charged energy in the first inductor L1 discharged. With reference to the second power conversion circuit forming the buck converter, the term T1 is for charging an energy in the second inductor L2, while the terms T2–T4 are for having the charged energy in the second inductor L2 discharged.

The operation in the event where the source AC is at an inverse polarity is shown in FIGS. 7a–7d, and waveforms of the currents and signals at respective parts in FIG. 7 arrangement are shown in FIG. 8. In this case, the operation will be substantially the same as that has been referred to with reference to FIG. 5.

When the load impedance is lowered, there is shown a tendency that the power consumed at the load decreases, and the input power becomes excessive with respect to the output power. In respect of this, in the prior art arrangement so long as the same is in stationary state, the control circuit allows the input power to be decreased by shortening the term T2 (FIG. 5) relating to the input power so as to have the above tendency balanced. Upon the short-circuit, however, the term T3 is present even after termination of the shortened term T2 (FIG. 8). That is, the current of the second inductor L2 on the side of the buck converter is caused to flow through a parasitic diode of the field effect transistor Q1 or Q2 commonly used, even if the shortened term T2 has terminated and the term T3 is reached to have all switching elements turned OFF so that, as viewed from the circuit on the side of the boost converter, the commonly used transistor Q1 or Q2 is caused to operate as if the same is kept in ON state, as shown in FIG. 6c or in FIG. 7c. This state is retained until the current value of the first inductor L1 coincides with the current value of the second inductor L2.

Difference in the phenomenon upon the short-circuit from that of stationary state occurs due to that the absolute value of the current of the second inductor L2 at the time when the term T2 terminates becomes larger than the absolute value of the current of the first inductor L1 as a result of the lowering of the load impedance upon the short-circuit. Because of this, the energy-accumulating current is caused to flow into the first inductor L1 for a longer term (t1–t3) than the term T2 required by the control circuit, consequent to which the excessive input occurs. Due to the above phenomenon, there has been a problem that, as the input power becomes no more controllable with the control circuit, the voltage Vec across the capacitor EC is caused to rise over the voltage upon the stationary operation. In an event when the power device of the foregoing arrangement is applied to the discharge lamp lighting device, in particular, it is necessary to assure a required current for maintaining the discharge at starting step at which an equivalent resistance of the load circuit including the discharge lamp is lowered, and the rise in the voltage Vec across the capacitor EC becomes an obstacle.

SUMMARY OF THE INVENTION

The present invention is to solve the foregoing problems, and it is an object of the invention to provide a power device capable of allowing the switching elements to be used in common for different purposes without increasing stress on the elements nor causing the withstand voltage of the element to rise even upon fluctuation in the load.

This object is realized by means of a power device of a circuit arrangement in which a series circuit of first and second switching elements Q1 and Q2 connected to be coincident in their forward direction with each other and respectively having an inverse directional current passing element connected in parallel to the switching element, a series circuit of third and fourth switching elements Q3 and Q4 connected to be coincident in their forward direction with each other and repectively having an inverse directional current passing element connected in parallel to the switching element and a series circuit of two rectifying elements D5 and D6 are connected in parallel to a smoothing capacitor EC, a series circuit of AC power source AC and first inductor L1 is connected between a node of the two rectifying elements D5 and D6 and a node of the first and second switching elements Q1 and Q2, and a series circuit of a load circuit L and second inductor L2 is connected between the node of the first and second switching elements Q1 and Q2 and a node of the third and fourth switching elements Q3 and Q4, characterized in that means DET is provided for detecting the state of the circuit arrangement so as to modify the operation of the switching elements in response to a lowering in a load resistance.

Other objects and advantages of the present invention shall be made clear in the following description of the invention detailed with reference to preferred embodiments of the invention as shown in accompanying drawings.

While the present invention shall now be described with reference to the respective embodiments of the invention as shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
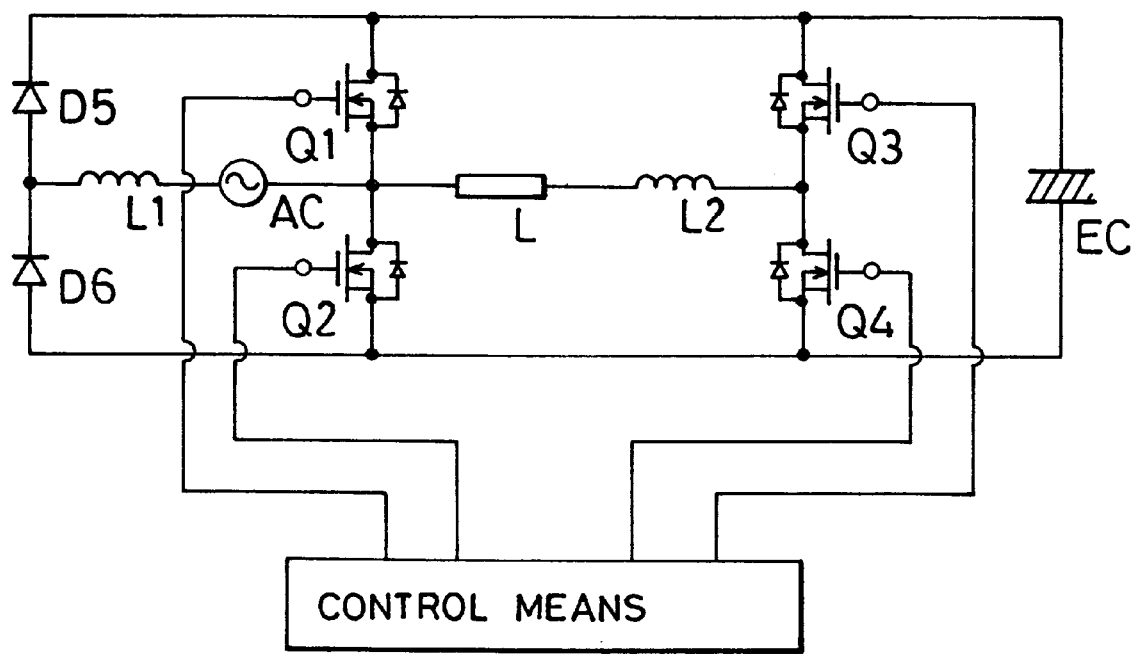
FIG. 1 is a circuit diagram showing a conventional power device.
Figure 2A:
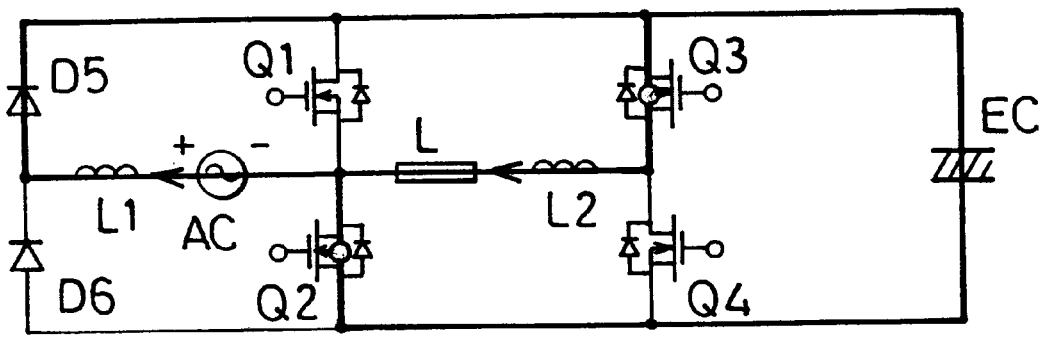
FIGS. 2 and 3 are explanatory circuit diagrams for the operation of the device shown in FIG. 1.
Figure 2B:
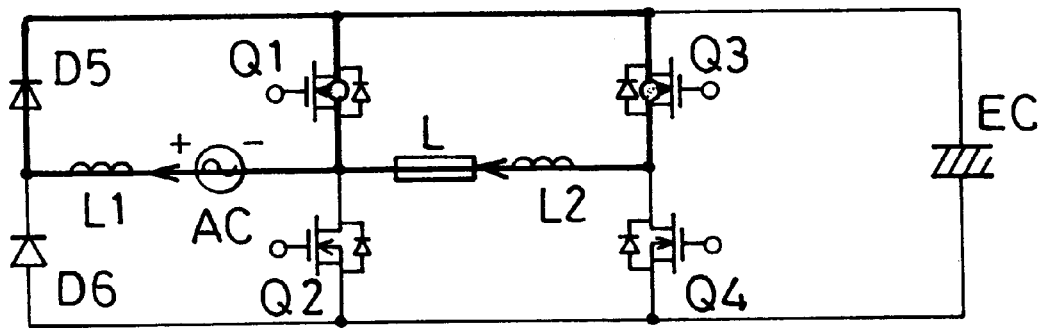
Figure 2C:
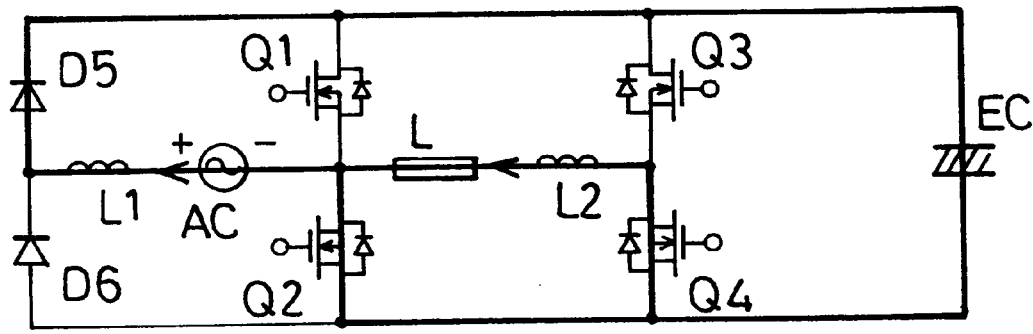
Figure 3A:
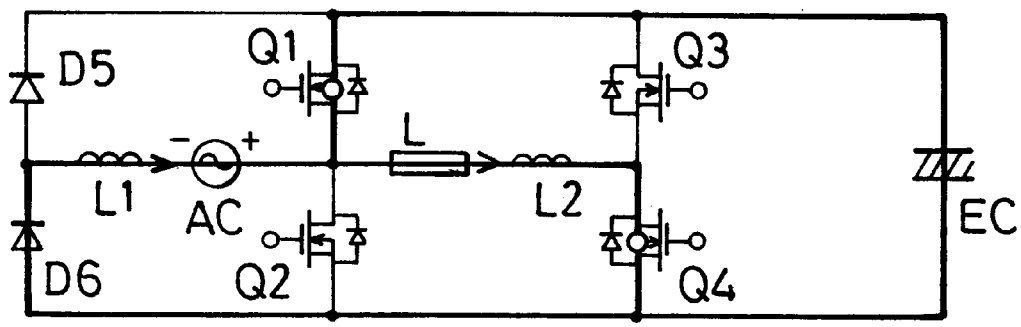
Figure 3B:
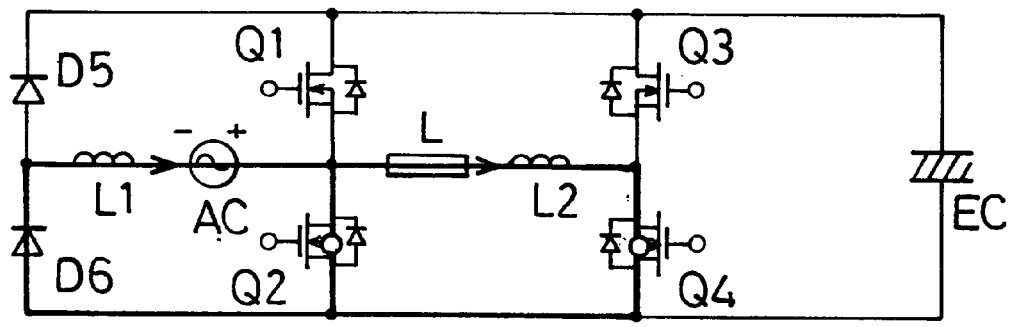
Figure 3C:
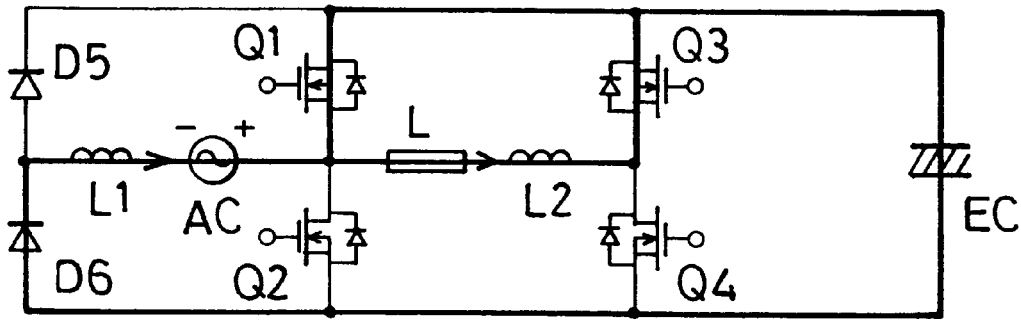
Figure 4A:
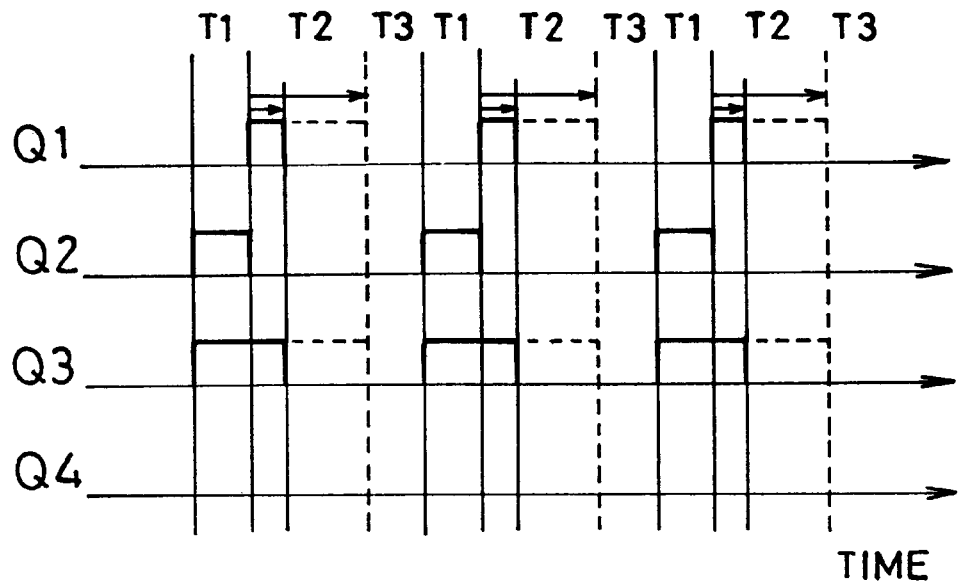
FIGS. 4 and 5 are waveform diagrams respectively for explaining the operation of the device of FIG. 1.
Figure 4B:
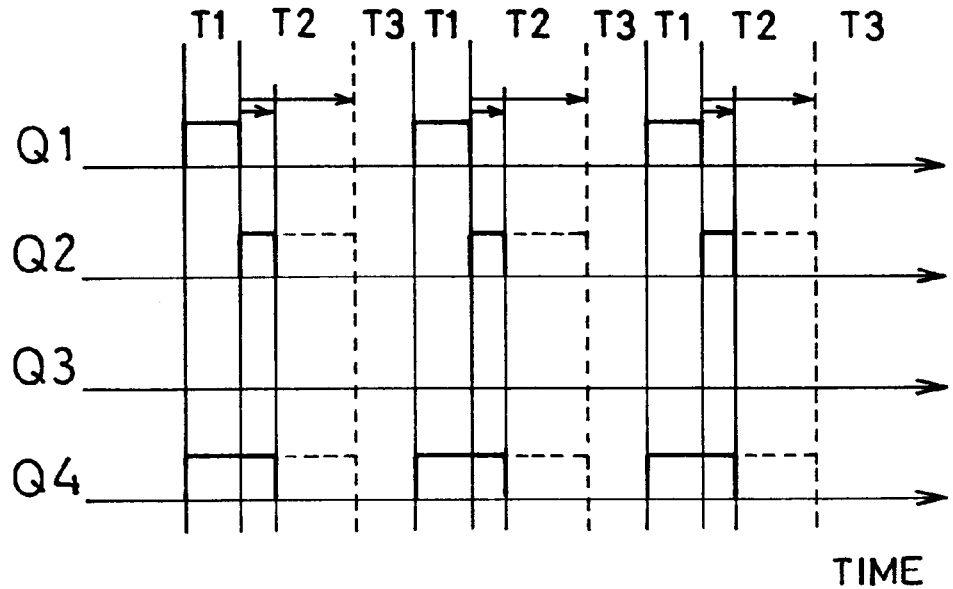
Figure 5:
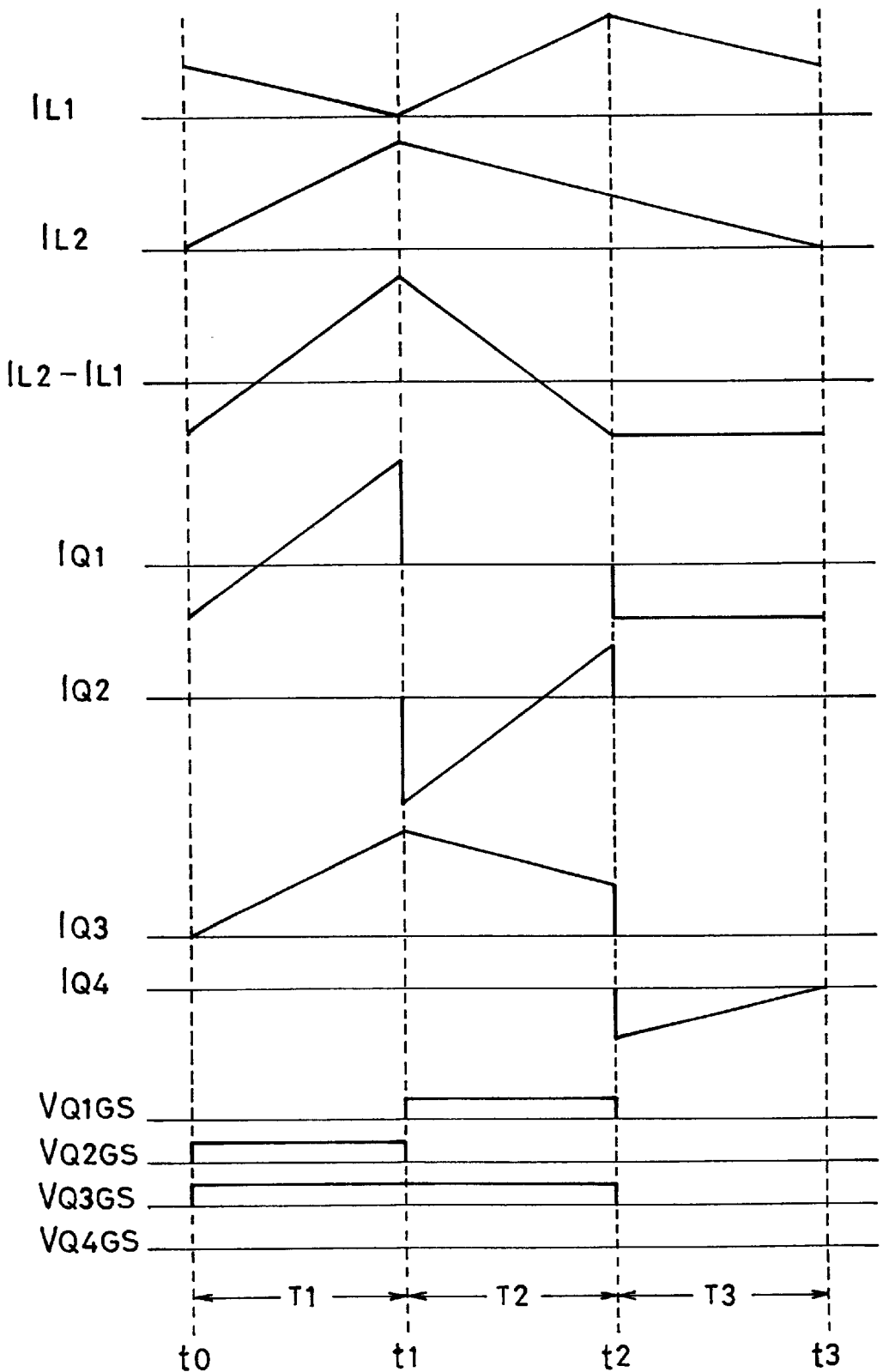
Figure 6A:
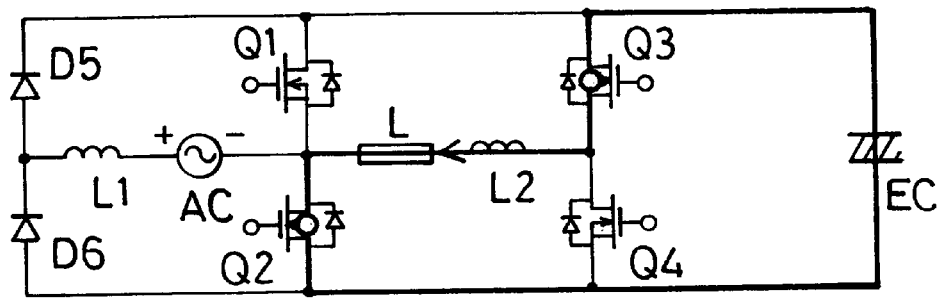
FIGS. 6 and 7 are explanatory circuit diagrams for the other operation of the device shown in FIG. 1.
Figure 6B:
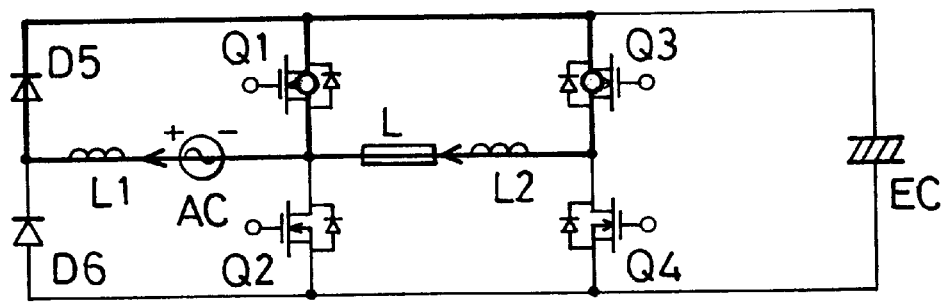
Figure 6C:
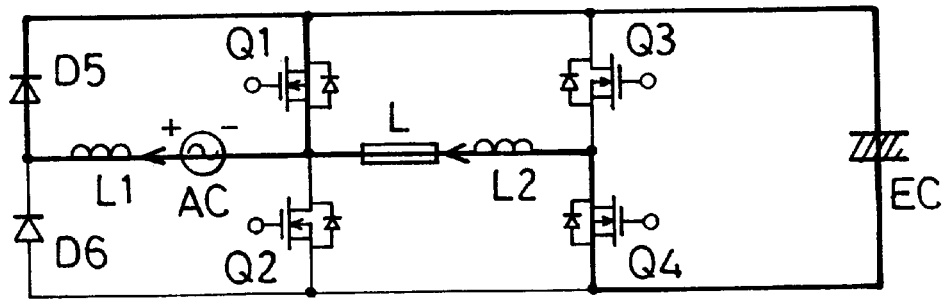
Figure 6D:
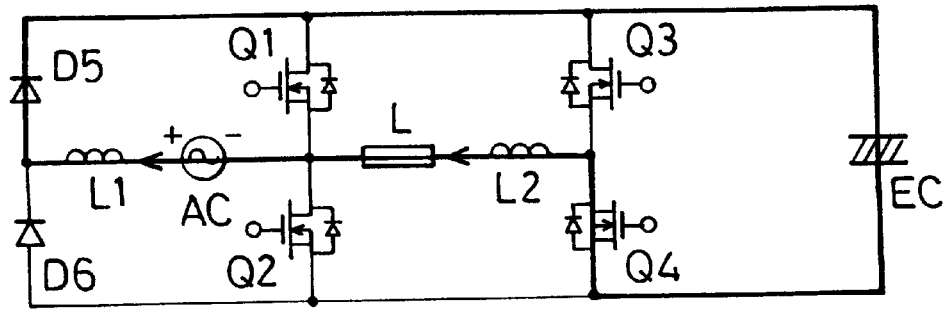
Figure 7A:
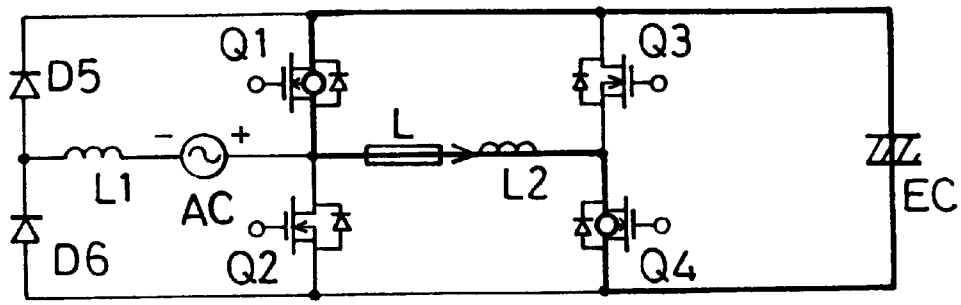
Figure 7B:
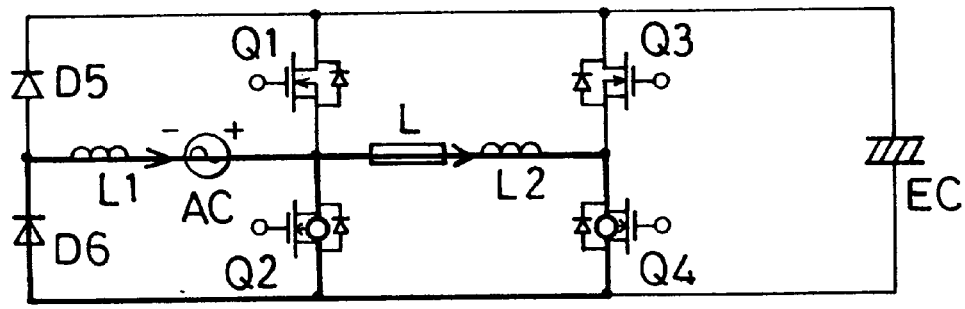
Figure 7C:
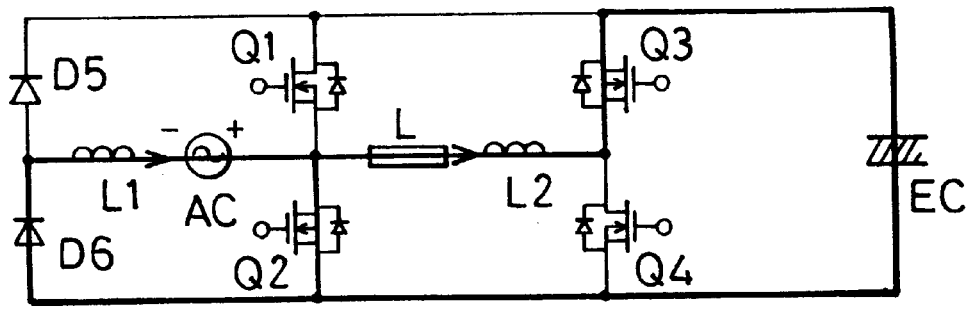
Figure 7D:
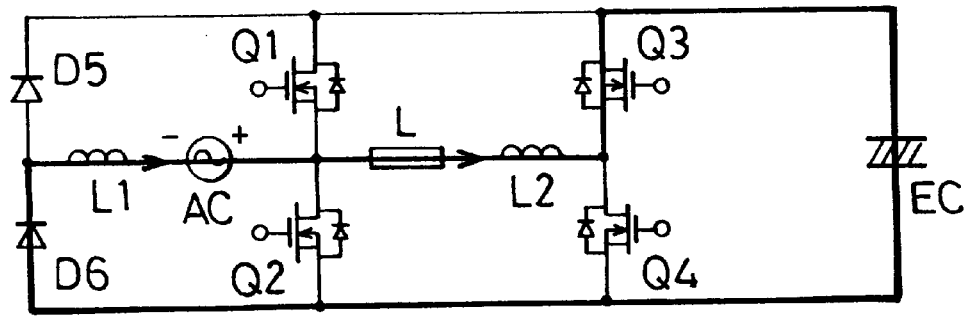
Figure 8:
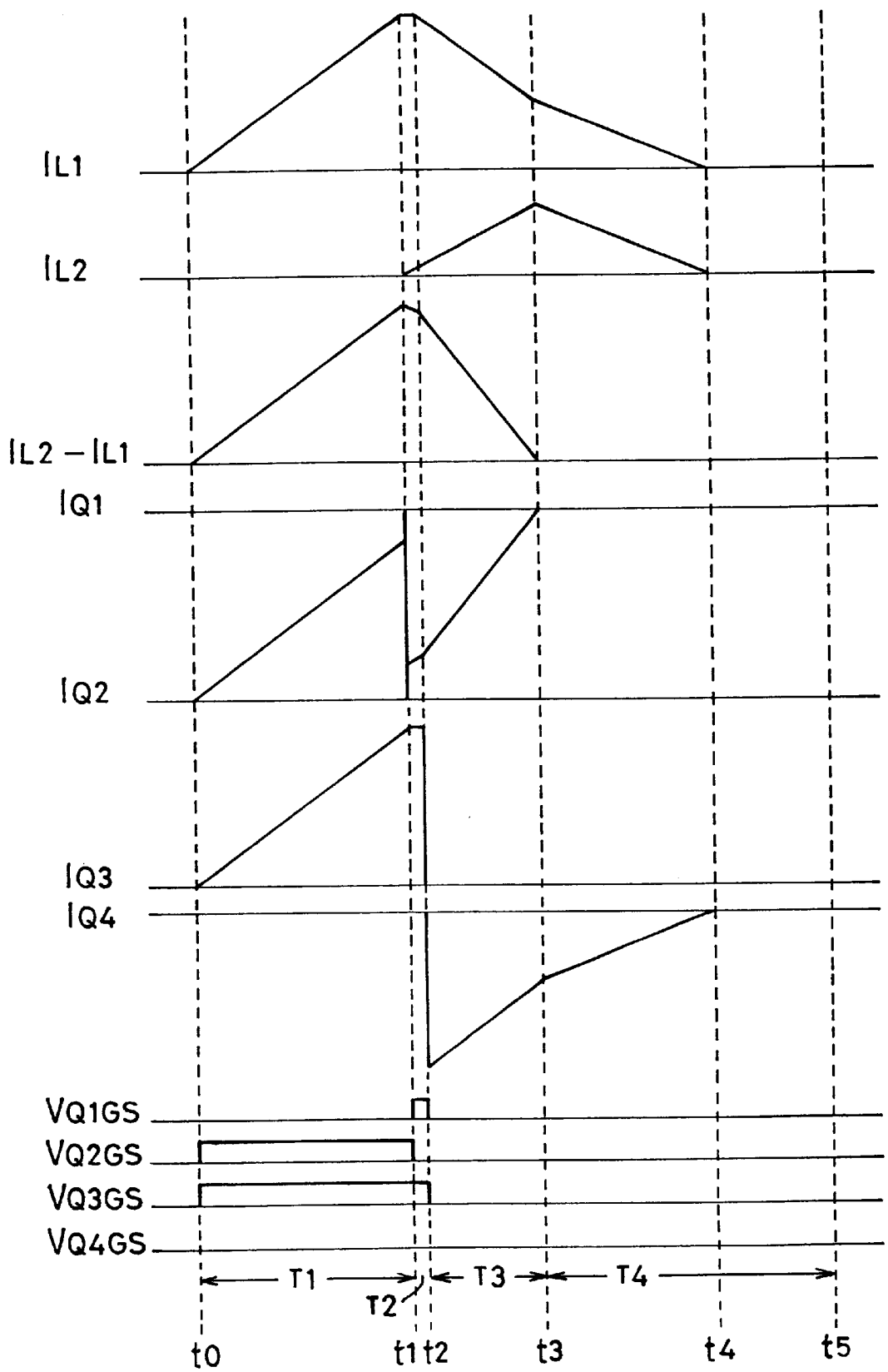
FIG. 8 is an explanatory waveform diagram for the other operation of the device shown in FIG. 1.
Figure 9:
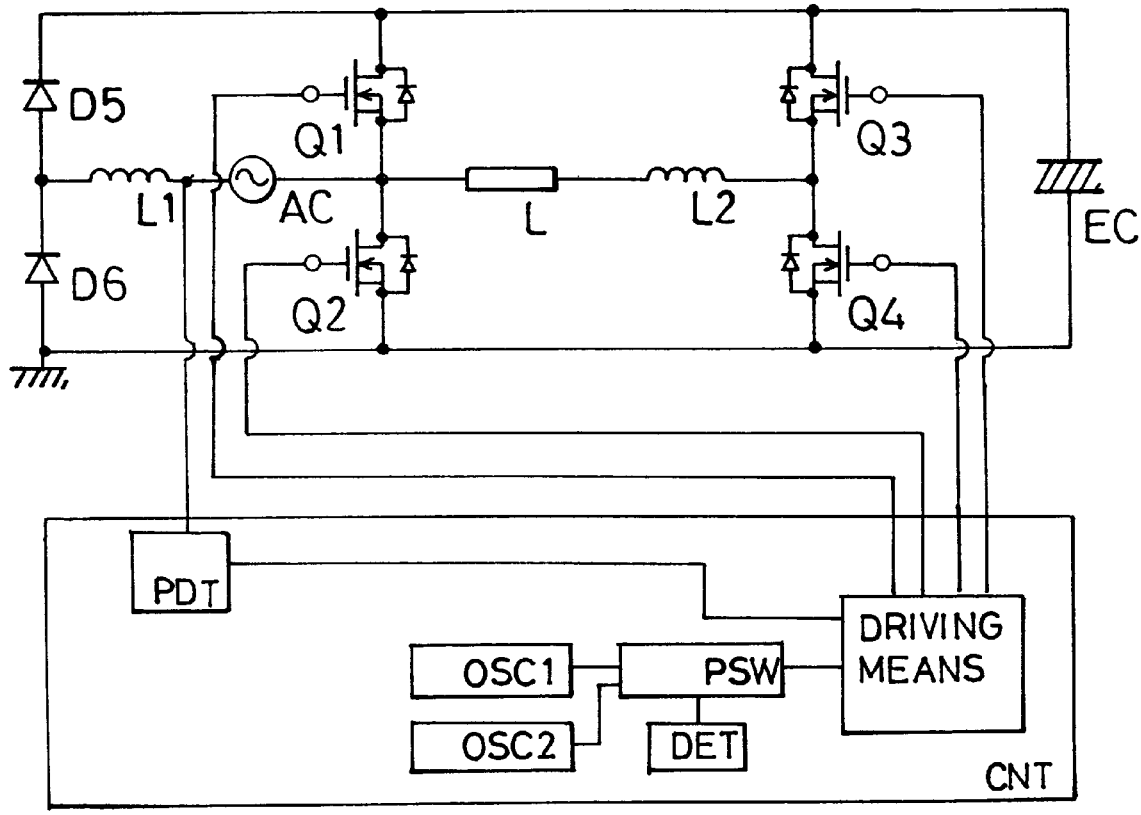
FIG. 9 is a circuit diagram showing an embodiment of the power device according to the present invention.

In FIG. 9, a preferred embodiment of the present invention is shown, in which a series circuit of first and second switching elements Q1 and Q2 connected to be coincident in their forward direction with each other and respectively having an inverse directional current passing element connected in parallel to the switching element as well as a series circuit of third and fourth switching elements Q3 and Q4 connected to be coincident in their forward direction with each other and respectively having an inverse directional current passing element connected in parallel to the switching element are connected in parallel to a capacitor EC at the same polarity. Further, a circuit in which two rectifying elements D5 and D6 are connected in series is connected in parallel to the capacitor EC to be at inverse polarity, and a series circuit of an AC power source AC and first inductor L1 is connected between a node of the two rectifying elements D5 and D6 and a node of the first and second switching elements Q1 and Q2, while a further series circuit of a load circuit L and second inductor L2 is connected between the node of the first and second switching elements Q1 and Q2 and a node of the third and fourth switching elements Q3 and Q4. The series circuit of the AC power source AC and first inductor L1 is connected on the side of the source AC to the node of the first and second switching elements Q1 and Q2, the series circuit of the load circuit L and second inductor L2 is connected on the side of the load circuit L to the same node of the first and second switching elements Q1 and Q2.

Figure 10:
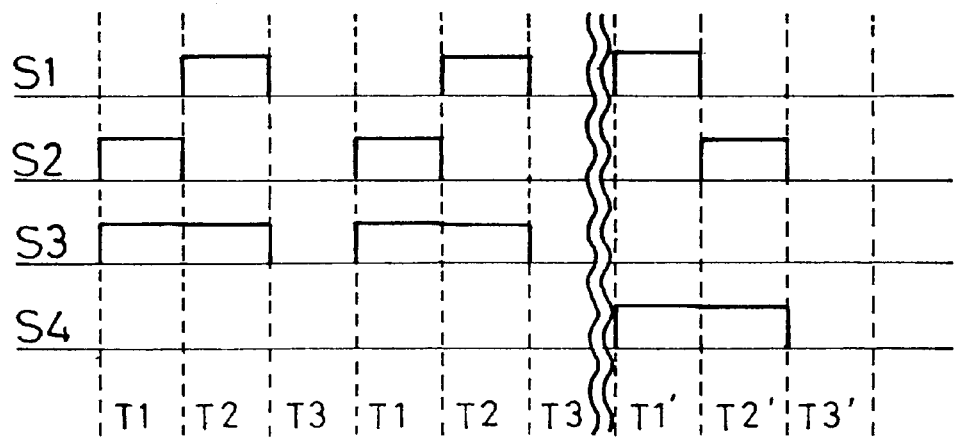
FIG. 10 is an explanatory waveform diagram for the operation of the circuit of FIG. 9.
Figure 11:
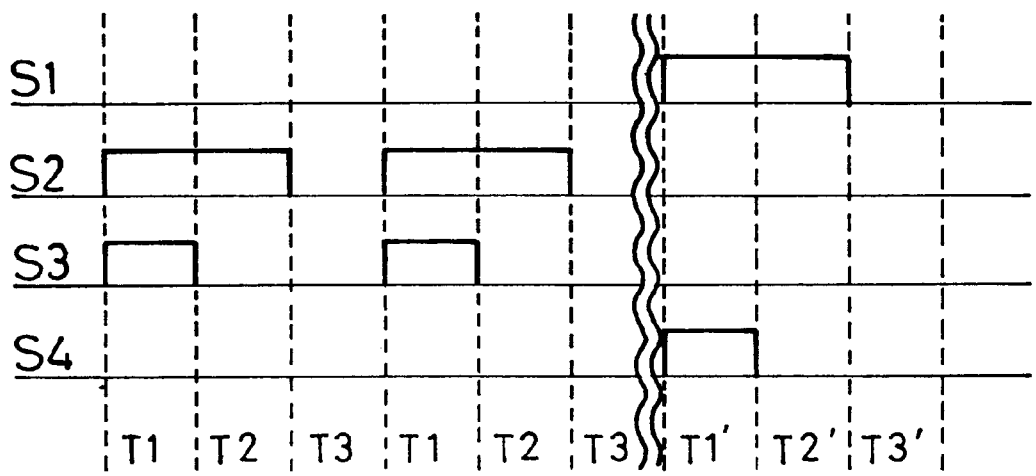
FIG. 11 is an explanatory waveform diagram for the other operation of the circuit of FIG. 9.
Figure 15:
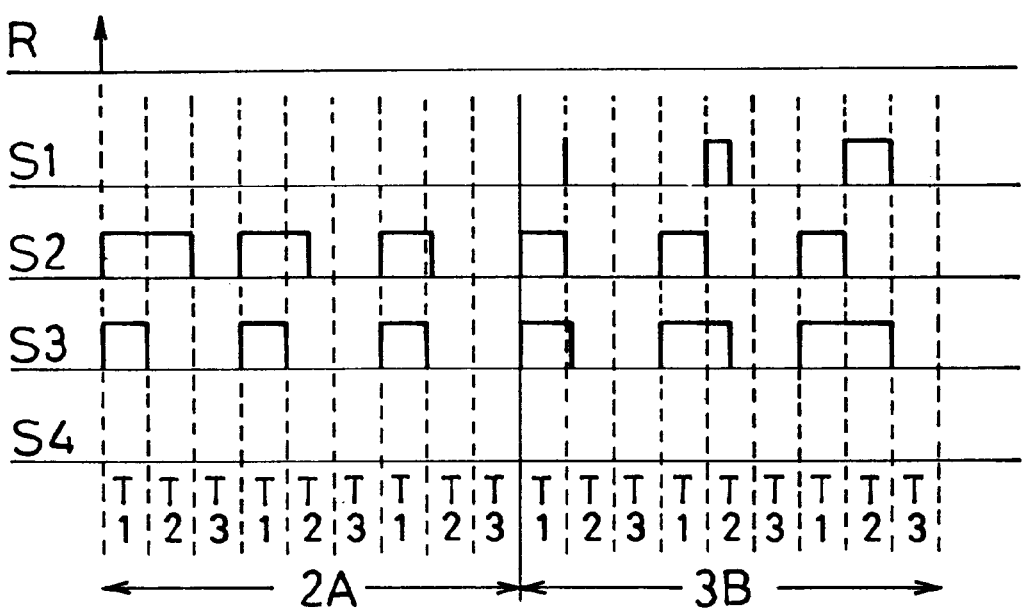
FIGS. 14 and 15 are explanatory waveform diagrams for the other operation of the circuit in FIG. 9.
Figure 12A:
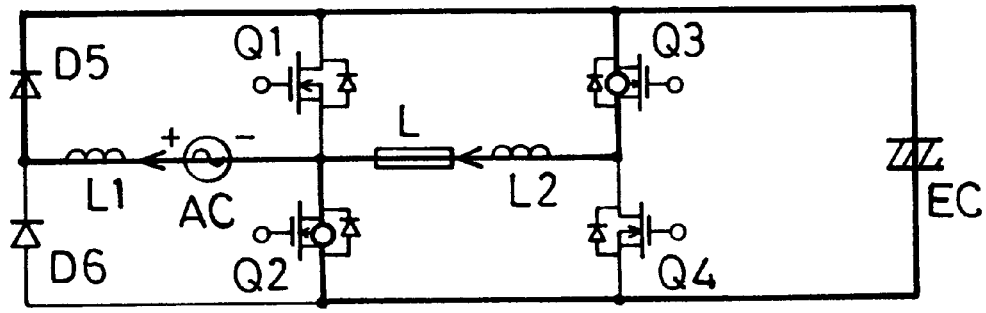
FIG. 12 is an explanatory circuit diagram for the operation in the circuit of FIG. 9.
Figure 12B:
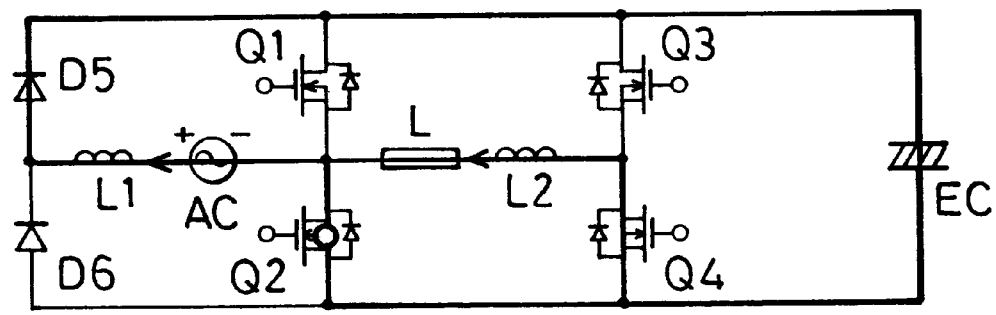
Figure 12C:
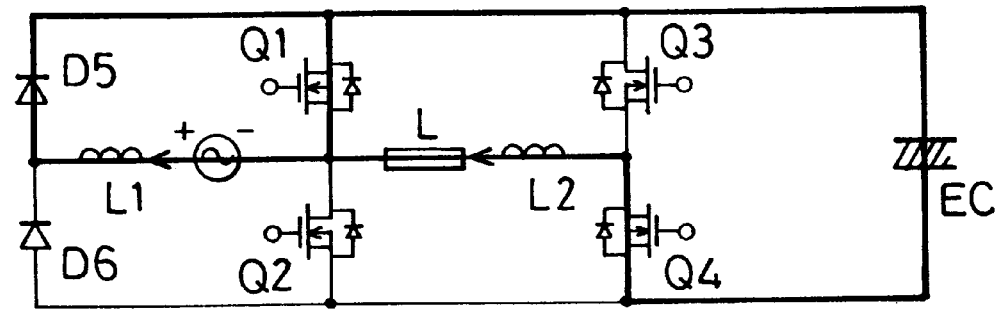
Figure 12D:
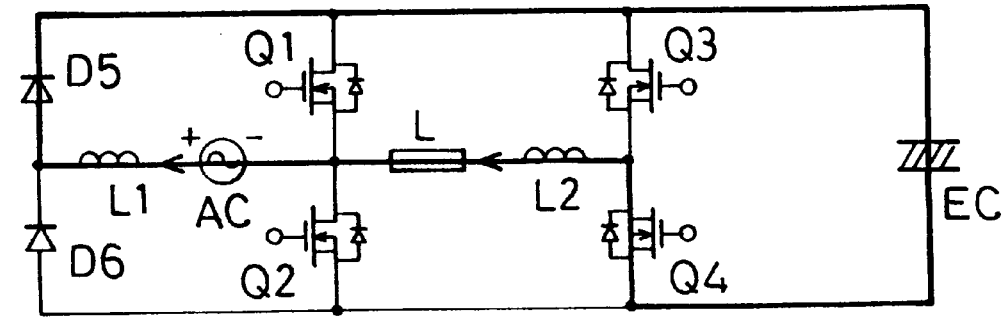

According to the present invention, further, the power device of the foregoing circuit arrangement is provided with means for detecting the state of the circuit, so that the operation will be changed over such that, upon steady state, the switching elements are made to carry out their switching operation with such driving signals as in FIG. 10 and, upon short-circuit operation, the switching elements are made to carry out the operation with such driving signals as in FIG. 11. As shown also in FIG. 15, the arrangement may be made to have the operation sequentially changed over in response to a load impedance R.

Embodiment 1:

The circuit arrangement of Embodiment 1 is as shown in FIG. 9, in which the main circuit is the same in the arrangement as that in the case of the foregoing prior art. On the other hand, a control circuit CNT in the present embodiment comprises two systems of signal generating circuits OSC1 and OSC2, switching means PSW for switching the signals of these two systems, a driving circuit DRV, and a circuit state detecting means DET. In accordance with the state detected by the circuit state detecting means DET, signals of either the signal generating circuit OSC1 or OSC2 are selected by the switching means PSW, and the driving signals for the switching elements Q1–Q4 are prepared with outputs of a polarity discriminating means PDT. While not specifically shown, the polarity discriminating means PDT is providing output signals for discriminating whether the polarity of the source AC is positive or negative.

The operation in the event where the load impedance is of a value more than a predetermined and the balance of input and output powers is stable, the operation will be the same as in the foregoing prior art, as based on the output of the signal generating circuit OSC1. This shall be referred to in the followings as "steady state". The driving signals S1–S4 for the switching elements Q1–Q4 in the steady state will be as shown in FIG. 10, so that the switching operation of terms T1–T3 are carried out, under the polarity of the source AC which is negative on the side of the node of the first and second switching elements Q1 and Q2 as in the prior art. When the polarity of the source AC is positive on the side of the node of the first and second switching elements Q1 and Q2, the switching operation of terms T1'–T3' are carried out.

In an event where, on the other hand, the circuit state detecting means DET has detected the load impedance to be low and the input power to be excessive, an output of the signal generating circuit OSC2 causes an operation for avoiding an abnormal voltage rise to take place. This shall be referred to in the followings as "short-circuit operation".

The driving signals S1–S4 for the respective switching elements Q1–Q4 upon the short-circuit operation in the present embodiment will be as shown in FIG. 11.

Next, the short-circuit operation in the present embodiment shall be described. First, in the state where the polarity of the source AC on the side of the node of the first and second switching elements Q1 and Q2 is negative, the operation takes place in the sequence of a period for turning ON the second and third switching elements Q2 and Q3, a period for turning ON the second switching element Q2 only, and a period for turning OFF all the switching elements Q1–Q4, whereas, in the state of positive polarity of the source AC on the side of the node of the first and second switching elements Q1 and Q2, the operation is performed in the sequence of a period for turning ON the first and fourth switching elements Q1 and Q4, a period for turning ON the first switching element Q1 only, and a period for turning OFF all the switching elements Q1–Q4 (FIG. 11).

Figure 13:
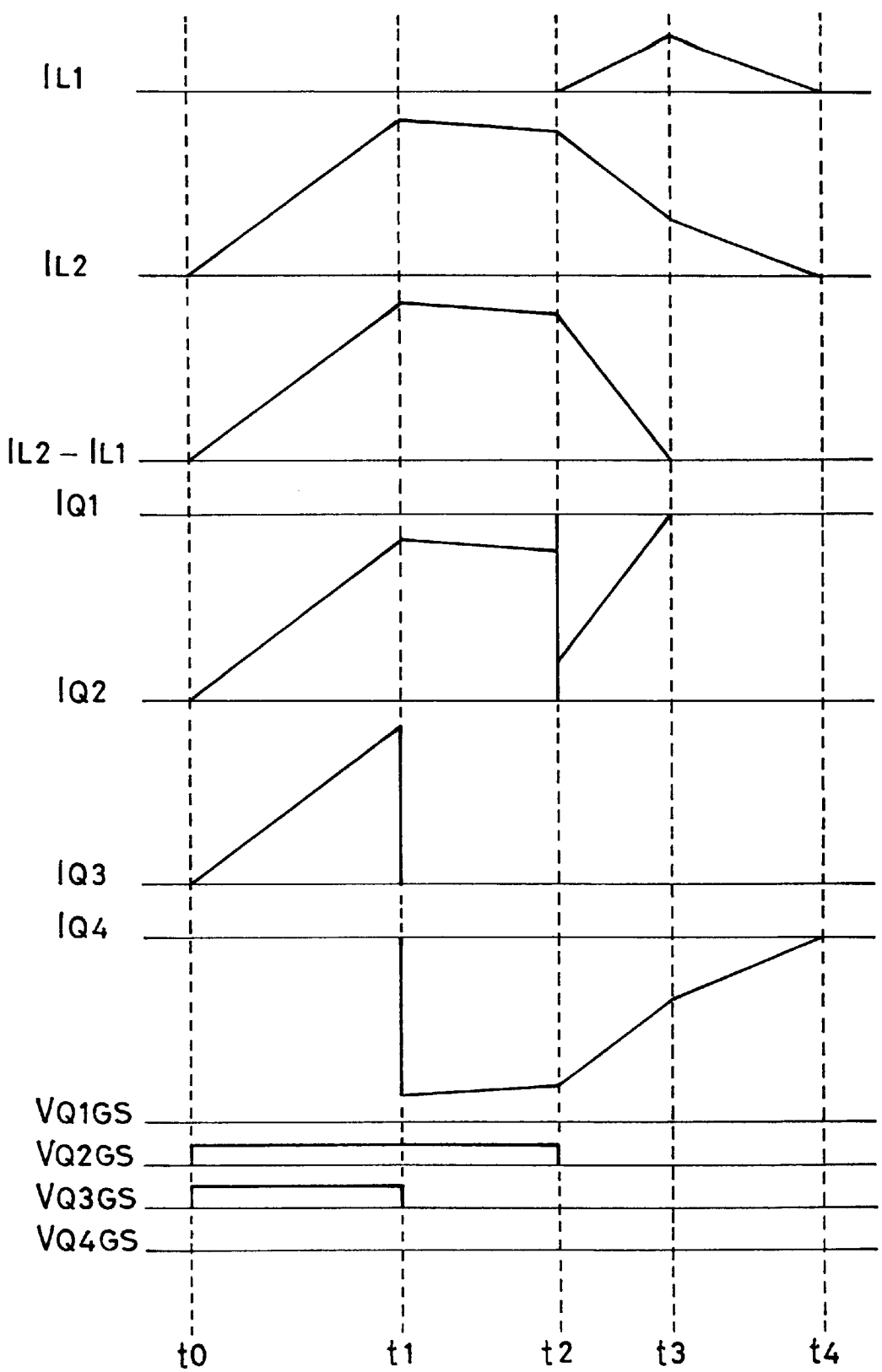
FIG. 13 is an explanatory waveform diagram for the other operation of the circuit of FIG. 9.
Figure 14A:
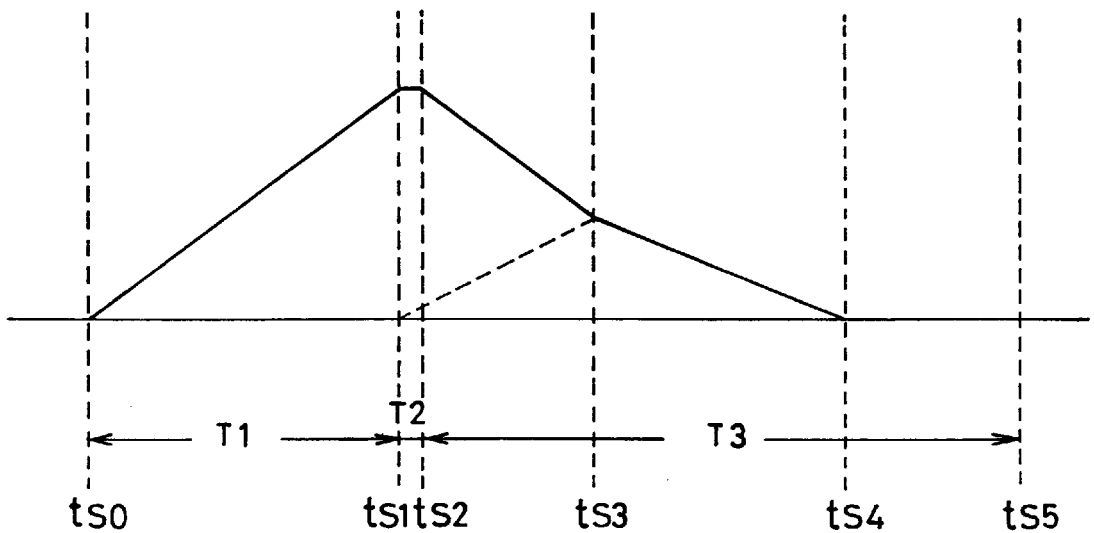
Figure 14B:
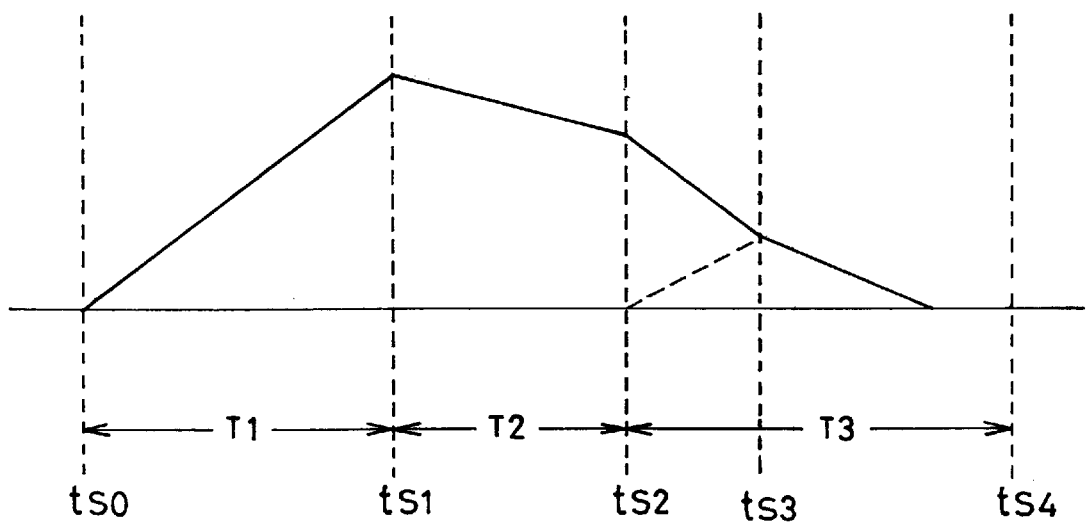

In FIG. 12, transition of the operation of the switching elements and current loop upon the short-circuit operation in the present embodiment is shown, while FIG. 13 shows current and signal waveforms at respective parts in the circuit. In this case, FIGS. 12 and 13 are of the operation in the state of the negative polarity of the source AC on the side of the node of the first and second switching elements Q1 and Q2. In FIGS. 14a and 14b, a comparison of a current waveform at the inductor L2 upon the short-circuit in the prior art with a current waveform at the inductor L2 upon the short-circuit in the present embodiment is shown, in which solid lines denote the current of the second inductor L2 and broken lines denote the current of the first inductor L1. In contrast to the current upon the short-circuit in the prior art (FIG. 14a), it is seen that, upon the short-circuit operation of the present embodiment (FIG. 14b), the current of inductor L2 at time ts2 is decreased due to the short-circuit operation, required time (ts2 to ts3) for equalization in the current value of both inductors L1 and L2 is shortened thereby, the accumulated energy amount in the inductor L1 is reduced, and the input power is reduced. Due to this, an effect of avoiding any abnormal voltage rise in the capacitor due to the excessive input power, in the event of low load impedance, is established.

Figure 16:
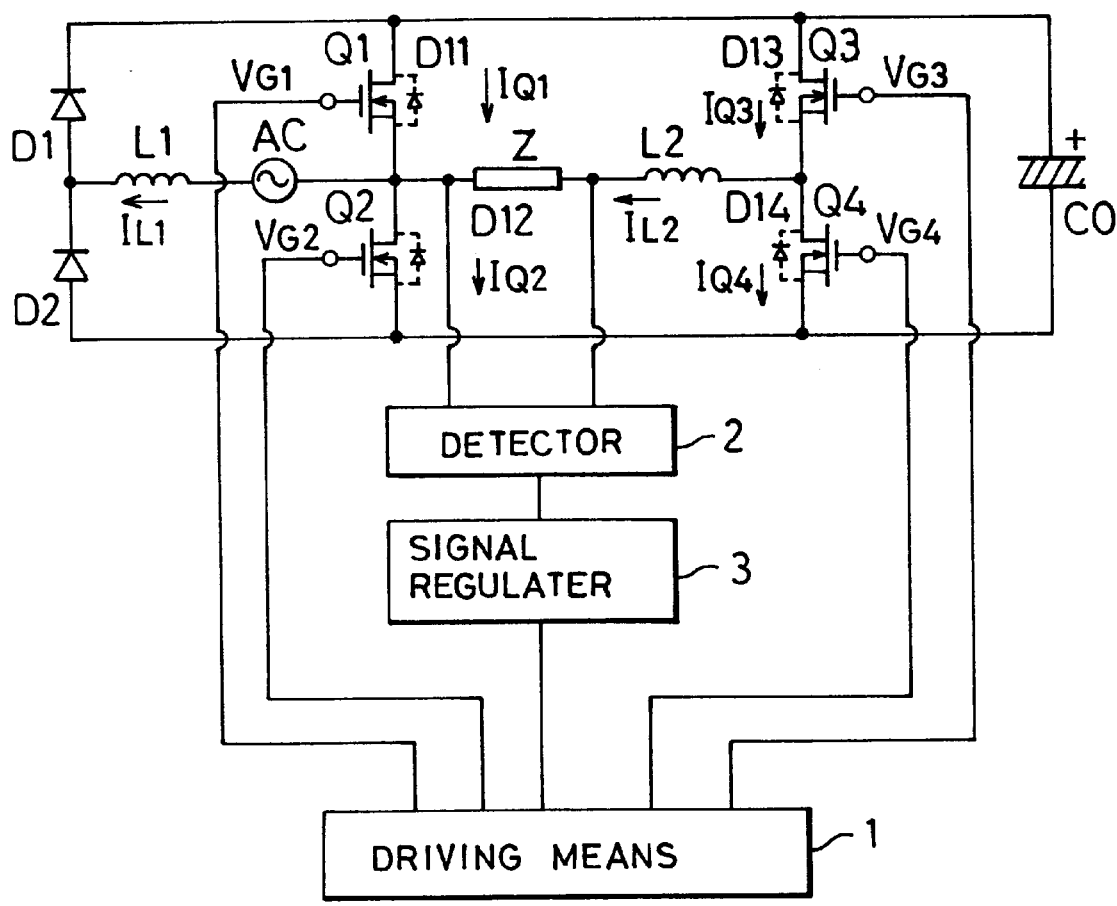
FIG. 16 is a circuit diagram showing another embodiment of the power device according to the present invention.
Figure 17A:
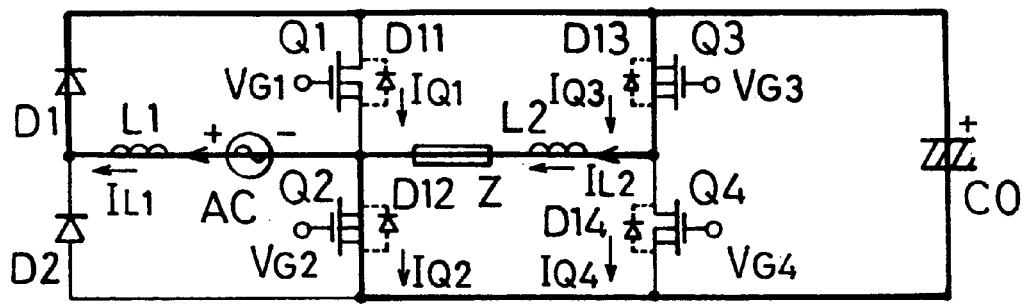
FIG. 17 is an explanatory circuit diagram for the operation of the circuit of FIG. 16.
Figure 17B:
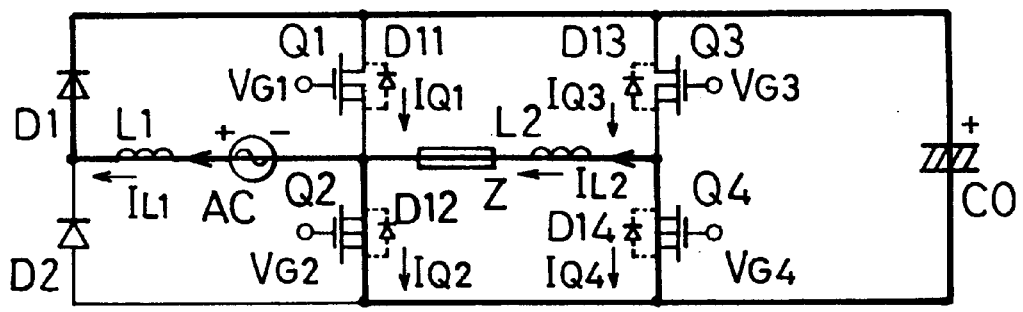
Figure 17C:
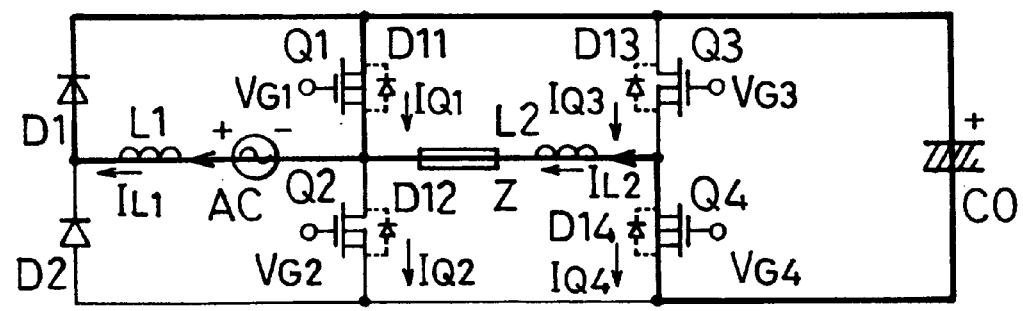
Figure 17D:
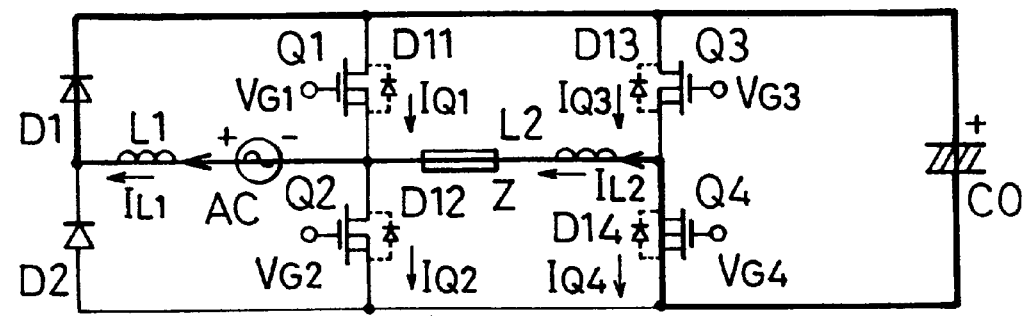

Embodiment 2:

In FIG. 16, a circuit diagram of Embodiment 2 according to the present invention is shown, in the power device of which the series circuit of the first and second switching elements Q1 and Q2 respectively comprising a field effect transistor carrying each of parasitic diodes D11 and D12, the series circuit of the third and fourth switching elements Q3 and Q4 respectively comprising the field effect transistor carrying each of parasitic diodes D13 and D14, and a series circuit of first and second diodes D1 and D2 are connected mutually in parallel across a smoothing capacitor C0. Further, between the node of the switching elements Q1 and Q2 and the node of the switching elements Q3 and Q4, the second inductor L2 and load circuit Z are connected in series, and, between the node of the switching elements Q1 and Q2 and the node of the diodes D1 and D2, the AC power source AC and first inductor L1 are connected in series.

An oscillatory driving circuit 1 is arranged for generating signals with which the switching elements Q1–Q4 perform a switching operation upon the short-circuit operation in Embodiment 1.

Figure 18:
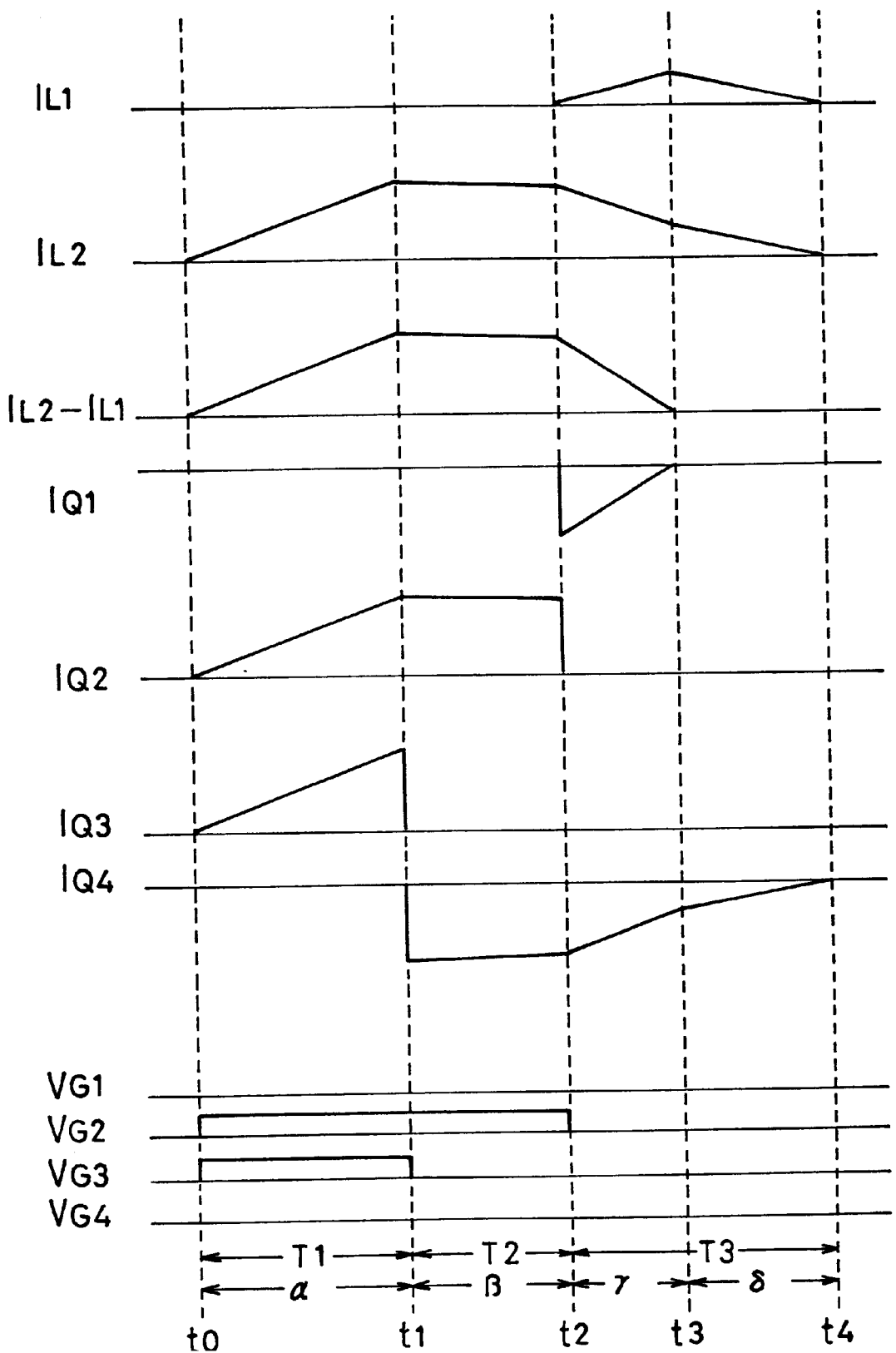
FIG. 18 is an explanatory waveform diagram for the operation of the circuit of FIG. 16.
Figure 19A:
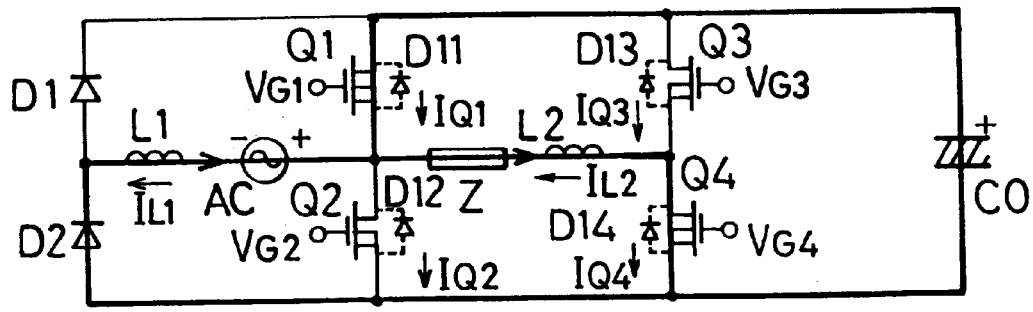
FIG. 19 is an explanatory circuit diagram for the other operation of the circuit of FIG. 16.
Figure 19B:
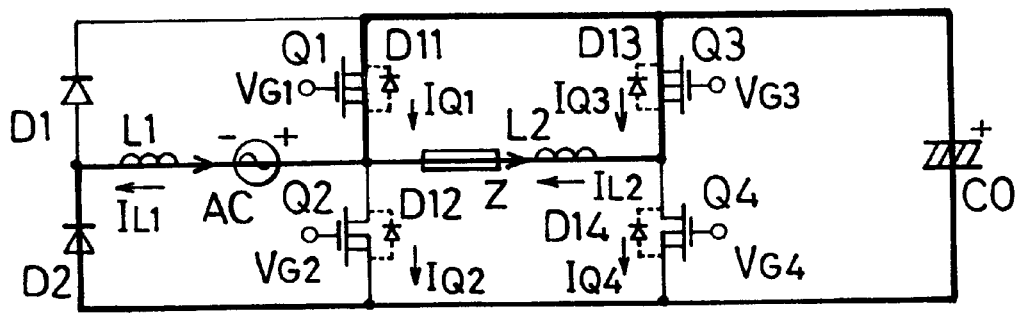
Figure 19C:
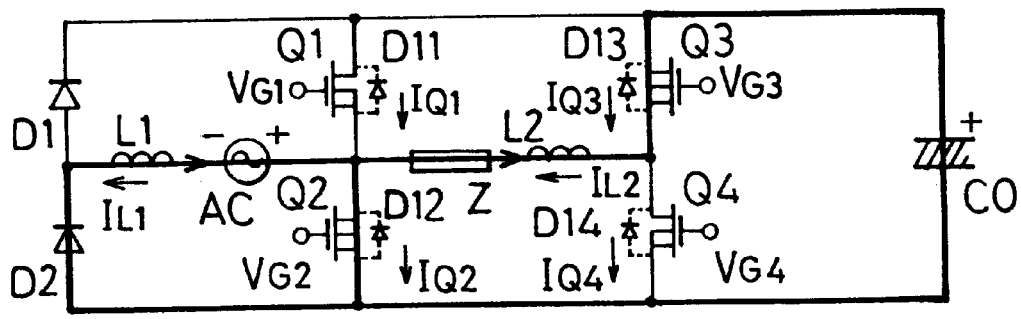
Figure 19D:
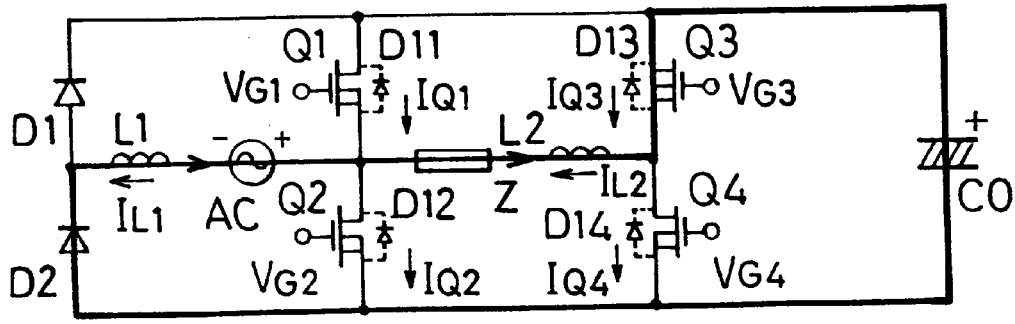

A load voltage detector 2 is provided for detecting a load voltage across the load circuit Z, and a signal regulater 3 is provided for regulating the operation of the driving circuit 1 in accordance with an output signal of the load voltage detector 2. The operation and waveforms with this circuit arrangement are shown in FIGS. 17–19.

Figure 20:
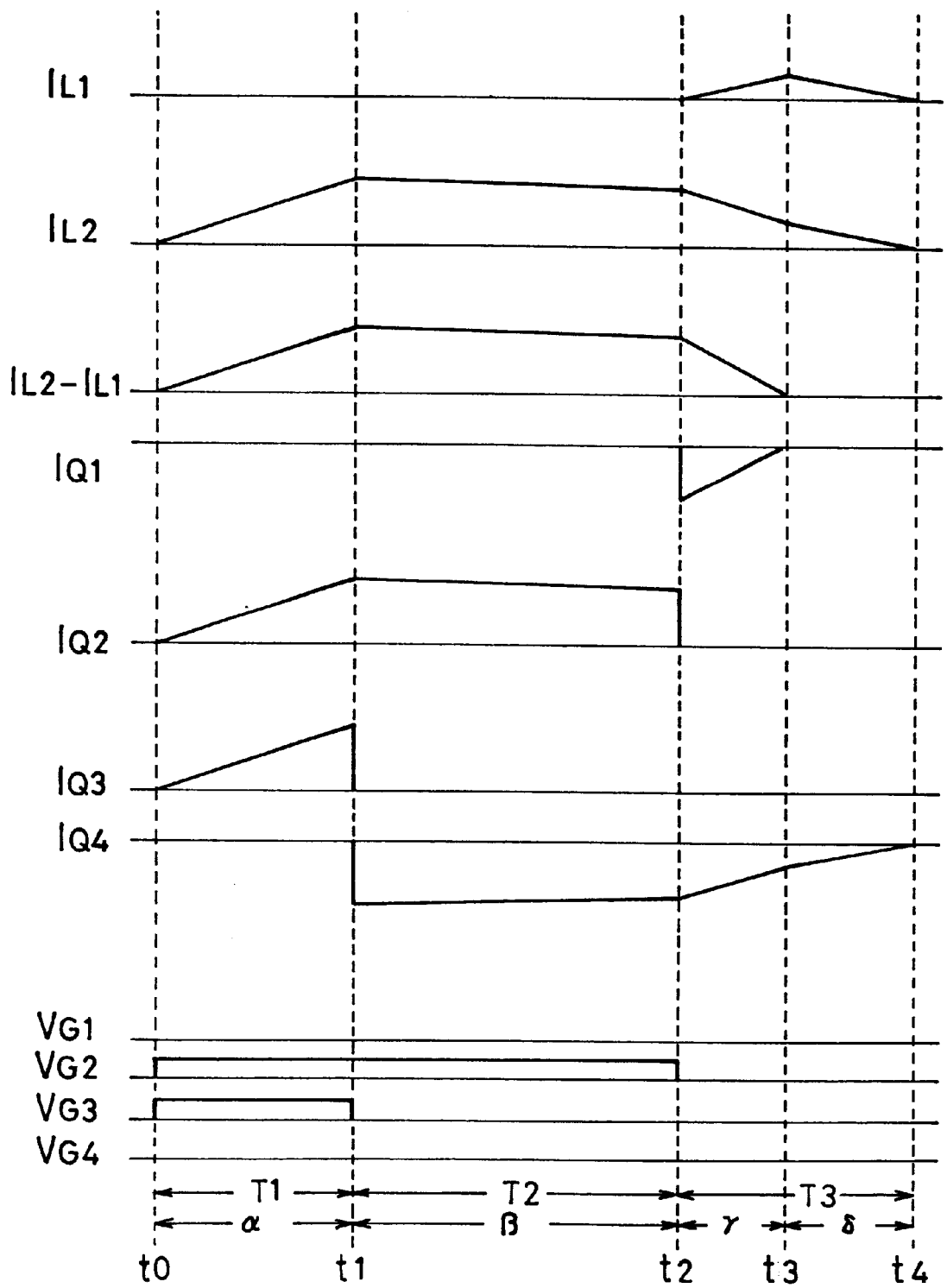
FIGS. 20 and 21 are explanatory waveform diagrams for the other operation of the circuit of FIG. 16.

As the voltage signal from the load voltage detector 2 increases, in the present embodiment, the term T1 generated by the oscillatory driving circuit 1 is elongated while the term T2 is shortened, and the switching frequency f is made higher (to shorten the cycle), whereby, when the voltage signal from the load voltage detector 2 is low (the load impedance is low), the term T1 is shortened while the term T2 is elongated and the frequency f is lowered (the cycle is elongated), consequent to which the term T1 is made shorter than in the case where the load impedance is high whereas the term T2 is made longer. FIG. 20 shows current and signal waveforms at respective parts in the circuit in the case when the load impedance is low.

Figure 21:
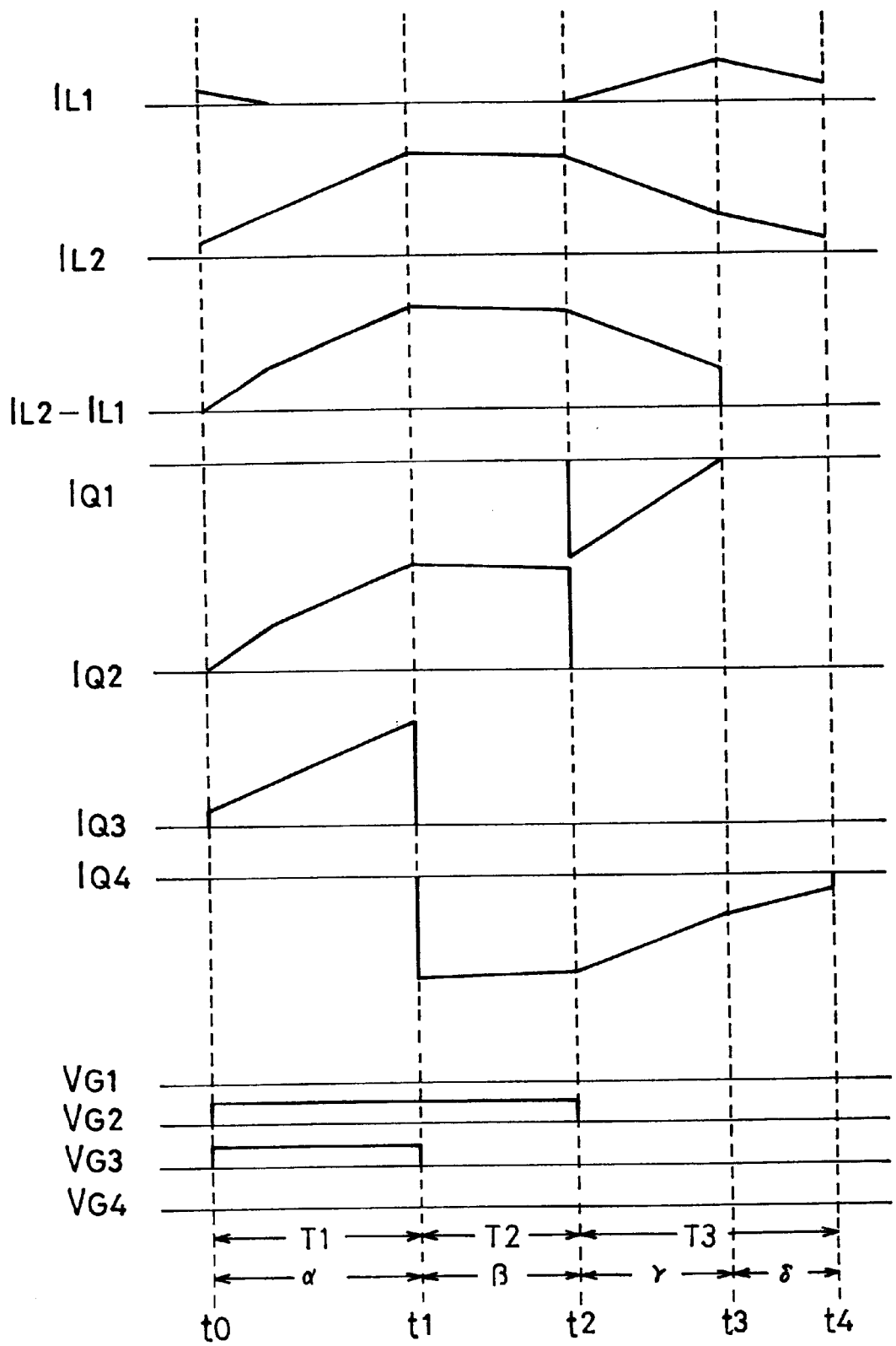

As will be clear when FIG. 20 is compared with FIG. 21 showing the similar waveforms in the event where the pulse width and frequency are not controlled, an initial value of the inductor current IL2 in the term T3 is lowered by rendering the term T1 shorter but the term T2 longer, as a result of which the period γ in the term T3 (the term corresponding to the charging period of the first power conversion circuit comprising the boost converter) is made shorter, so that the energy supplied by the source is reduced, a continuous mode in which the inductor current IL2 flows continuously can be dissolved, and an integration value of the inductor current IL2 can be reduced as compared with the prior art. As a result, it is enabled to prevent from occurring such problems that the voltage across the smoothing capacitor C0 rises excessively upon the low load impedance or that any stress on the switching elements Q1–Q4 increases. It is also made possible to assure a sufficient output power even under the low load impedance, while maintaining the peak value of the inductor current IL2 at the same level as that upon the steady state in the prior art.

Further, in an arrangement provided with the load voltage detector 2 for detecting the voltage across the load circuit Z and providing the voltage signal proportional to the absolute value of the detected voltage, and with the signal regulator 3 only for controlling the oscillatory driving circuit 1 to cause the periods increased in response to increase in the voltage signal from the load voltage detector 2, the same effect as in the foregoing arrangement can be attained while not so remarkable.

Figure 22:
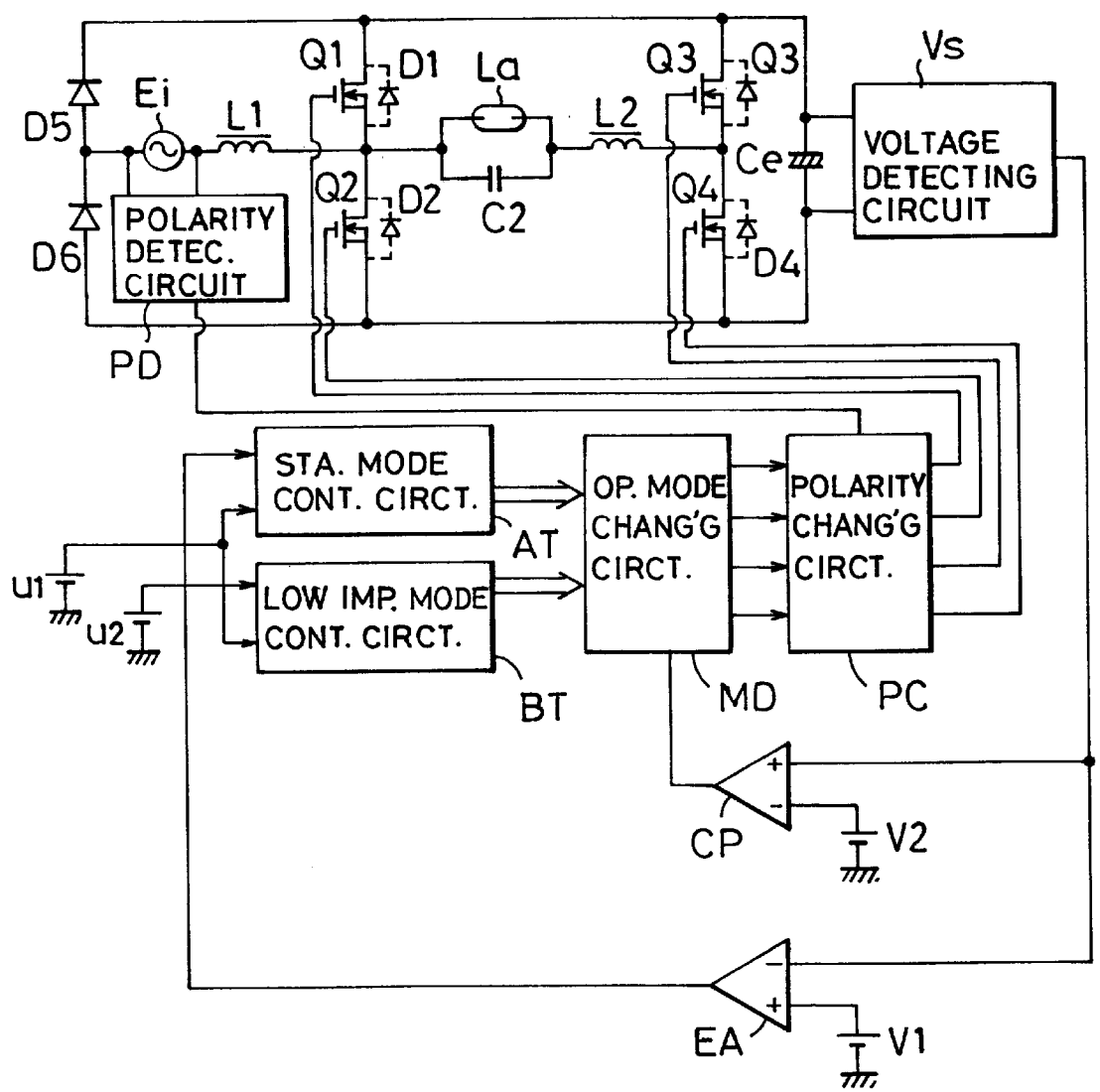
FIG. 22 is a circuit diagram showing another embodiment of the power device according to the present invention.

Embodiment 3:

In this embodiment, the device is arranged as in FIG. 22, so as to be featured in change-over timing of the operation.

The commercial AC power source Ei, switching elements Q1–Q4, smoothing capacitor Ce, inductors L1 and L2, inverse and parallel current passing elements of the switching elements, and diodes D5 and D6 are employed substantially in the same connecting relationship as in the foregoing known arrangement.

On the other hand, the switching elements Q1–Q4 are controlled by means of a polarity changing circuit PC. Since the operation of the switching elements Q1–Q4 is changed over in accordance with the polarity of the AC source Ei, as has been described with reference to the prior art, the control sequence of the switching elements Q1–Q4 is changed over by the polarity changing circuit PC in accordance with the output of the polarity detector PD detecting the polarity of the source Ei.

Further, in order that the operation of the switching elements Q1–Q4 is changed over between the steady mode and the low impedance mode, during the steady state of the load circuit Z and under the low impedance of the load circuit Z, the control circuit is provided with a steady mode controlling circuit AT generating a signal of a timing corresponding to the steady mode and with a low impedance mode controlling circuit BT generating a signal of a timing corresponding to the low impedance mode, and the operation change-over is determined by an operation mode changing circuit MD which selects either one of outputs from these mode controlling circuits AT and BT. The timing of change-over by the operation mode changing circuit MD shall be described later.

Figure 23A:
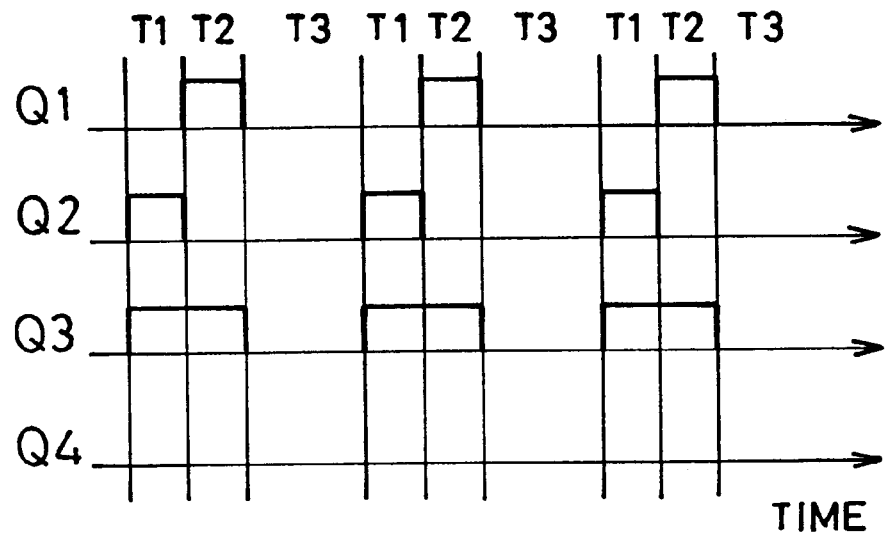
FIGS. 23 and 24 are explanatory waveform diagrams respectively for the operation of the circuit of FIG. 22.
Figure 23B:
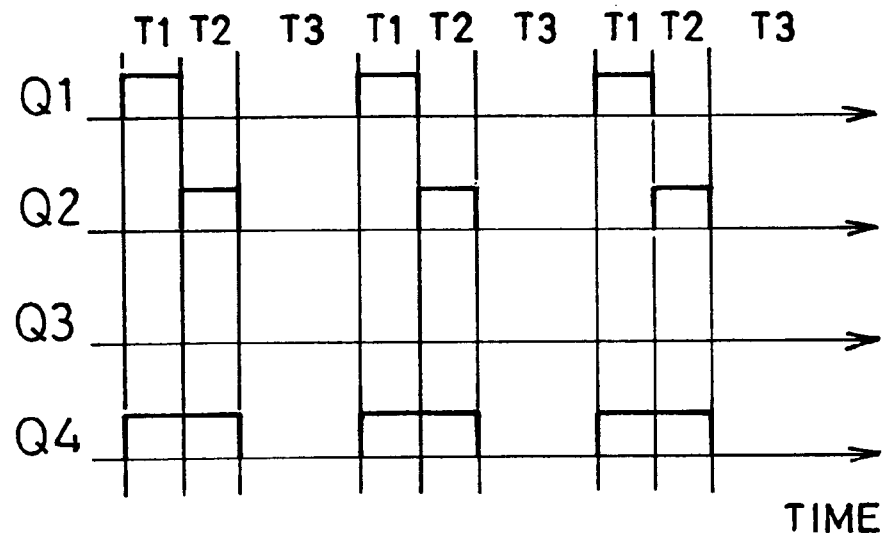
Figure 24A:
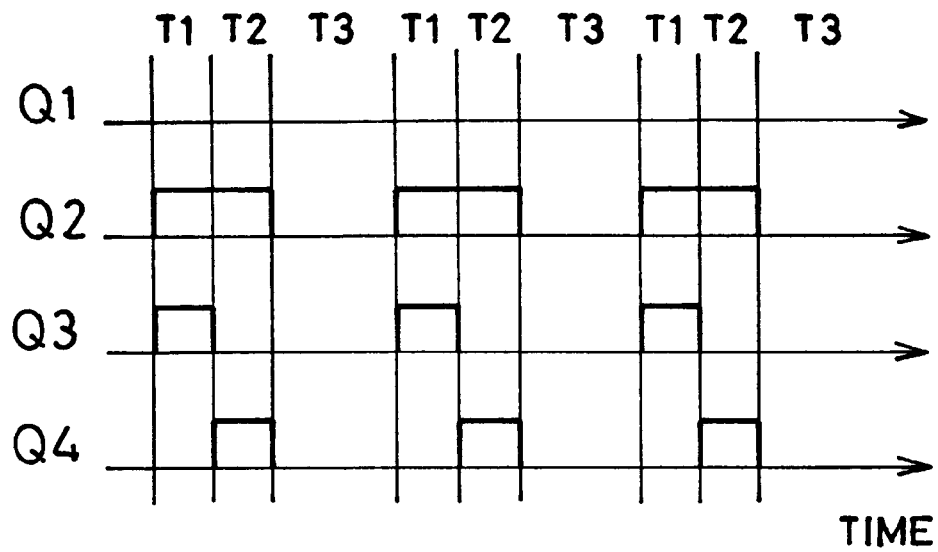
Figure 24B:
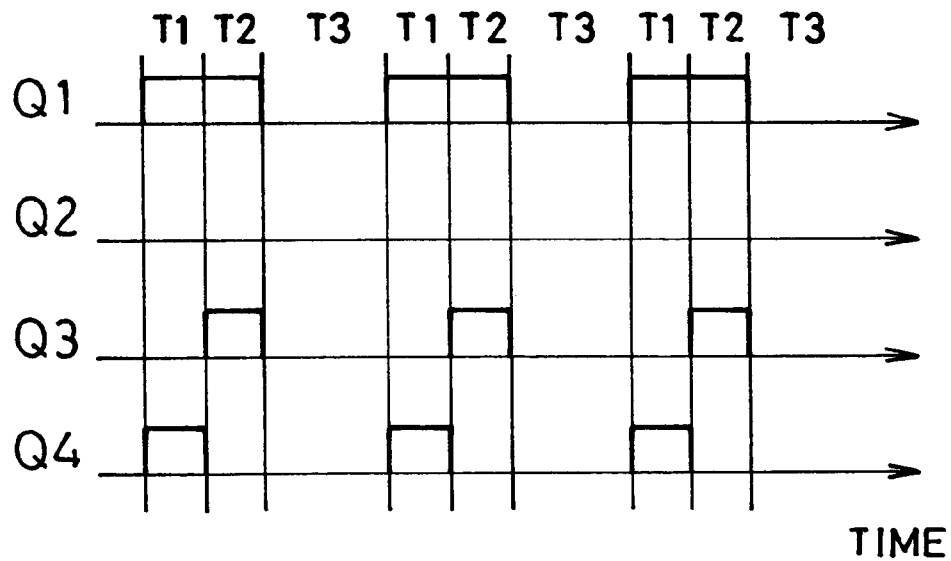

In the steady mode, the term T2 is so varied as to keep the voltage across the capacitor Ce constant. That is, a voltage detecting circuit VS is provided for detecting the voltage across the capacitor Ce, a difference between the voltage Vce across the capacitor Ce as detected by the circuit VS and a reference voltage V1 is obtained by means of an error amplifier EA, and the term T2 is controlled by varying an input voltage to the steady mode controlling circuit AT in accordance with an output of the error amplifier EA. The term T2 is to be elongated if the voltage Vce across the capacitor Ce is lower than the reference voltage V1 set at the error amplifier EA, or to be shortened if the voltage Vce is higher than reference voltage V1, and the voltage Vce across the capacitor Ce is to be kept constant with this operation. The term T2 in the low impedance mode controlling circuit BT is kept constant (the reference voltage for keeping it constant is shown by u2), while the term T1 in the steady mode controlling circuit AT and low impedance mode controlling circuit BT is kept constant in the same length (the reference voltage for keeping it constant is shown by u1). Driving sequence in the steady mode is shown in FIGS. 23a and 23b while driving sequence in short-circuit mode is shown in FIGS. 24a and 24b.

On the other hand, the operation mode changing circuit MD is controlled by an output of a comparator CP for comparing magnitude relationship between the voltage Vce across the capacitor Ce detected by the detecting circuit Vs and a comparison voltage V2 (>V1), and the mode changing circuit MD is so controlled as to select the steady mode in a period when the voltage Vce across the capacitor Ce is lower than the comparison voltage V2, or to select the low impedance mode when Vce is higher than V2. Here, the comparison voltage V2 is set higher than the reference voltage V1 for the reason that the comparison voltage V2 is a voltage for determining the change-over point between the steady mode and the low impedance mode, whereas the reference voltage V1 is for determining a reference value of the control within a range of the steady mode.

Figure 25:
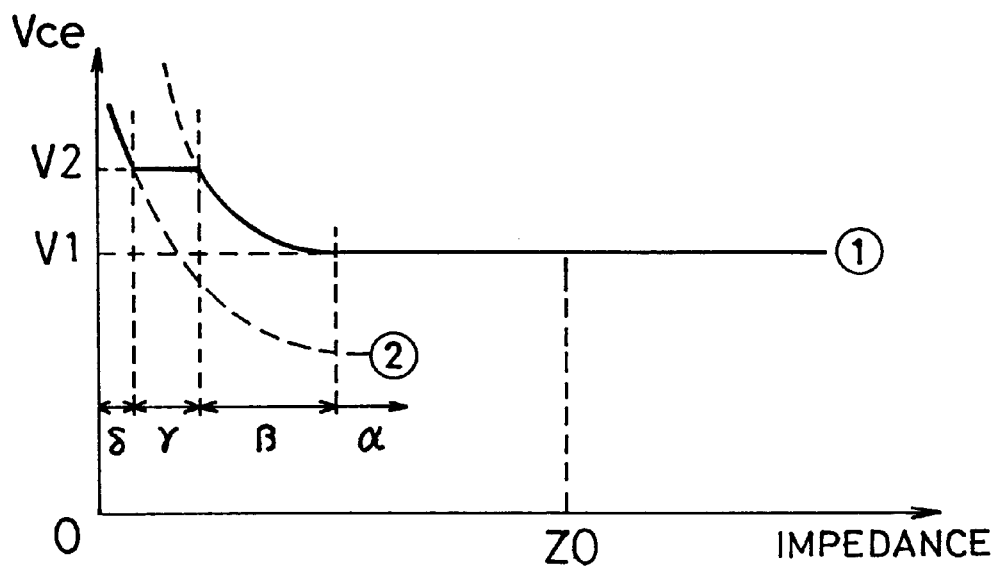
FIG. 25 is an explanatory diagram for the other operation of the circuit of FIG. 22.

With the above arrangement, the voltage Vce across the capacitor Ce is caused to vary as shown in FIG. 25, in which the voltage Vce upon operation in the steady mode is shown by a curve ① and the voltage Vce upon the short-circuit mode is shown by a curve ②. That is, in a zone α around an impedance ZO upon rated operation of discharge lamp La in the load circuit, the voltage Vce across the capacitor Ce is kept constant (at the reference voltage V1) and, in a zone β of smaller impedance than in the zone α, the voltage Vce rises higher as the impedance becomes smaller. At this time, the term T2 does not exist.

As the voltage Vce across the capacitor Ce has reached the comparison voltage V2, the operation is changed over from the steady mode to the low impedance mode. Here, the term T1 is equal in both of the steady mode and low impedance mode, the voltage Vce across the capacitor Ce upon transition from the steady mode to the low impedance mode (=V2) is higher than the voltage attainable in the low impedance mode, and the voltage Vce across the capacitor Ce is caused to be lowered. Consequently, the voltage Vce across the capacitor Ce tends to be below the comparison voltage V2, so as to return to the steady mode again, and the voltage Vce tends to rise again. Thus, in a zone γ, the steady mode and low impedance mode are concurrently present as mixed, so that the voltage Vce across the capacitor Ce can be maintained to be adjacent to the comparison voltage V2.

Here, the capacity of the capacitor Ce is set to be sufficiently large with respect to the current flowing to the load circuit Z, so that the voltage Vce across the capacitor Ce can be prevented from being abruptly caused to vary. When in particular the term T1 is set substantially equal in both of the steady and low impedance modes, variation in the current flowing to the load circuit Z is reduced even upon change-over of the mode, because the term T1 is one for supplying the power from the capacitor Ce to the load circuit.

In a zone δ in which the impedance of the load circuit Z becomes still smaller, the voltage Vce across the capacitor Ce rises above the comparison voltage V2. As compared with a case of controlling only in the steady mode, however, abnormal rise of the voltage Vce across the capacitor Ce up to the load circuit Z of small impedance can be prevented.

Since as has been described the voltage Vce across the capacitor Ce can be prevented from rising abnormally even when the impedance of the load circuit Z is made smaller, it is enabled to employ such circuit constituents as the capacitor Ce, switching elements Q1–Q4 and so on which are relatively low in the withstanding voltage, small in size and low in costs. Further, since the voltage Vce across the capacitor Ce is maintained substantially constant upon change-over of the controlled operation of the switching elements Q1–Q4, the current to the load is not caused to remarkably vary, and even a high voltage discharge lamp included in the load circuit can be prevented from flickering off.

Embodiment 4

Figure 26:
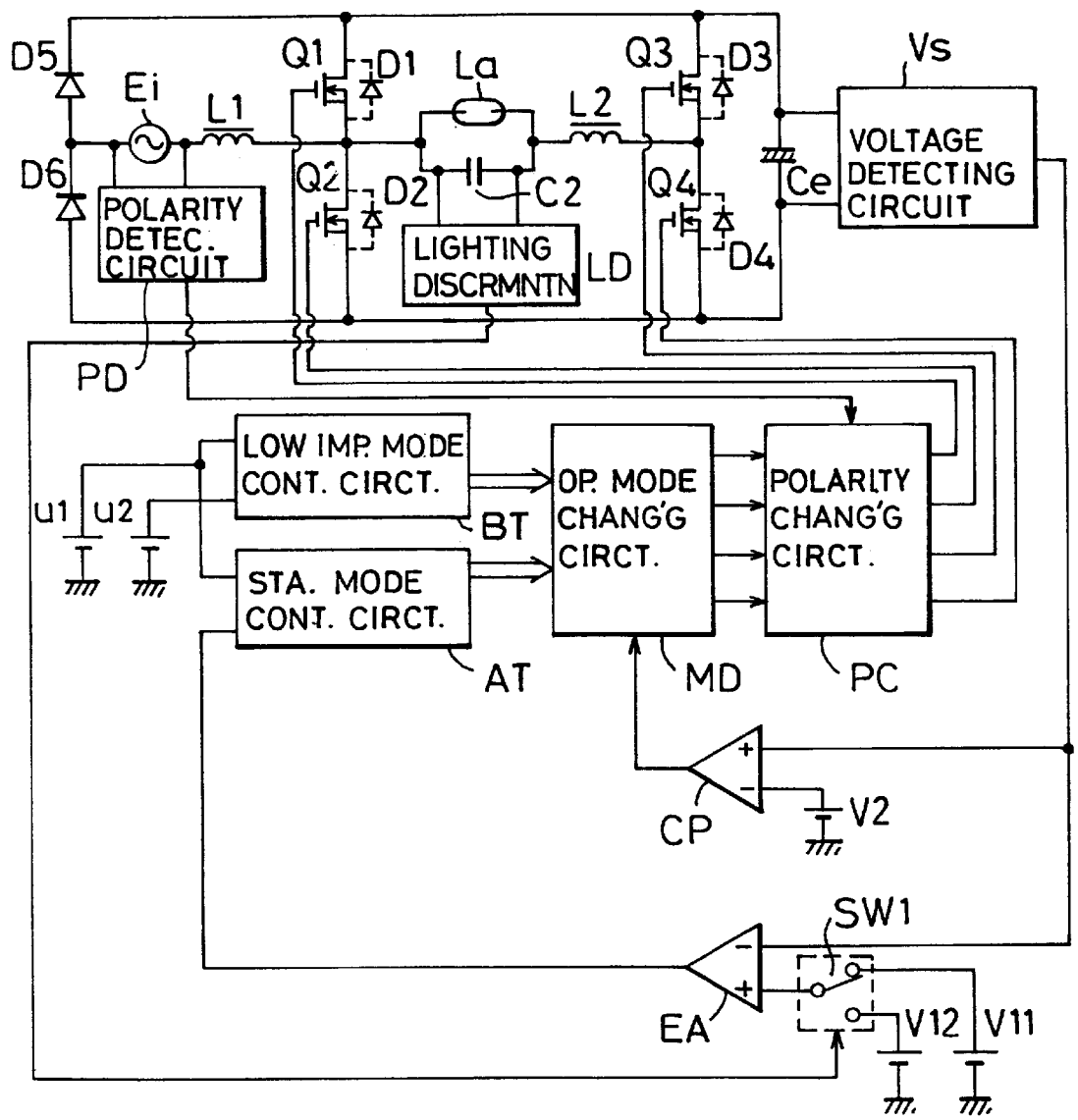
FIG. 26 is a circuit diagram showing another embodiment of the power device according to the present invention.

In Embodiment 4, as shown in FIG. 26, a lighting discrimination circuit LD is provided as a load detection circuit, in contrast to the circuit arrangement of Embodiment 1, so that, to be distinct therefrom, the reference voltage of the error amplifier EZ will be changed over by means of a switch SW1 between V11 and V12 (V2>V12>V11) in accordance with lighting state of the discharge lamp La as detected by the lighting discrimination circuit LD.

Figure 27:
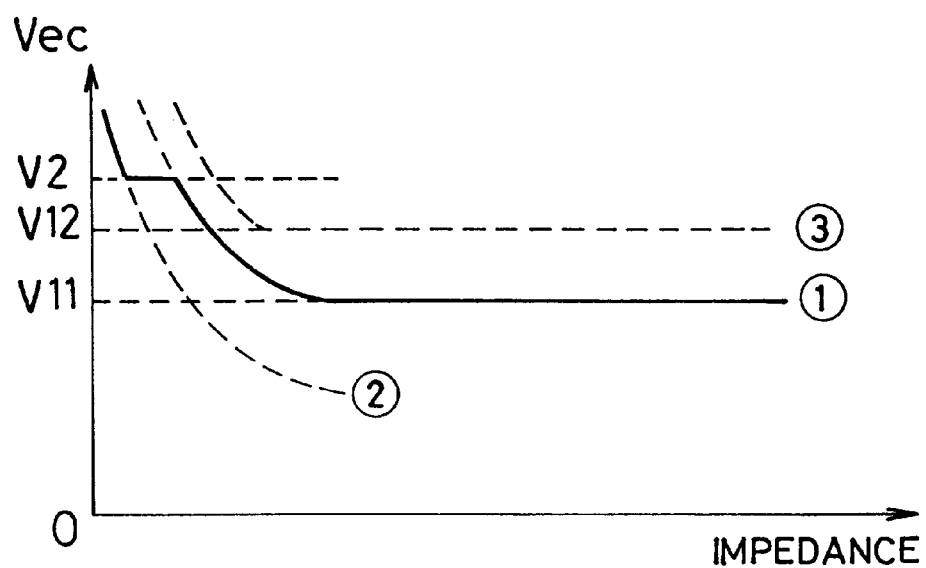
FIG. 27 is an explanatory diagram for the operation of the circuit shown in FIG. 26.

Now in the present embodiment, the arrangement is made, as in the above, to change over the reference voltage in the term T2 in the steady mode in two stages of V11 and V12, so that two types of the voltage maintained in the steady mode are provided, upon which the lighting discrimination circuit LD is to disciriminate if the discharge lamp La is lighted or not lighted (loadless) on the basis of the voltage across the discharge lamp LA, such that, upon not lighted, the voltage across the discharge lamp becomes higher than that in the lighted state, and the lighted or not lighted state can be discriminated through comparison of the voltage across the lamp with any proper threshold value. Thus, the higher reference voltage V12 is selected in the not lighted state. That is, in the steady mode in the lighted state of the discharge lamp La, the operational characteristics shown by a curve ① in FIG. 27 is attained, while in the steady mode in the not lighted state, the operational characteristics shown by a curve ③ in FIG. 27 is attained, and in the low impedance mode the operational characteristics shown by a curve ② in FIG. 27 is attained. In respect of the term T1, however, the setting is so made that the characteristics will be the same in both of the stationary and low impedance modes.

According to the foregoing arrangement, the voltage Vce across the capacitor Ce can be higher upon lighting the lamp than in the case of the steady mode, so that a sufficient voltage can be applied rapidly to the load and, even when the load is the high voltage discharge lamp, the same can be reliably started.

What is claimed is:

1. A power device for providing to a load circuit an AC voltage synchronized with an AC power source, the device comprising a first series circuit of first and second switching elements connected to be coincident in their forward direction with each other and respectively having an inverse directional current passing element connected in parallel to the switching element, a second series circuit of third and fourth switching elements connected to be coincident in their forward direction and respectively having an inverse directional current passing element connected in parallel to each switching element, a third series circuit of two rectifying elements in the same direction as the inverse directional current passing elements, a smoothing capacitor to which the first, second and third series circuits are connected in parallel, a first inductor connected through the AC power source between a node of the switching elements of the first series circuit and a node of the two rectifying elements in the third series circuit, and a second inductor connected through the load circuit between the node of the switching elements in the first series circuit and a node of the switching elements in the second series circuit, wherein the device further comprises a boost converter connected to the AC power source and including at least part of the switching elements and first inductor, a buck converter connected to the smooth- ing capacitor and including at least part of the respective switching elements and the second inductor, a control circuit for controlling the operation of the respective switching elements to have at least one of the switching elements used in common in the boost and buck converters and to provide a period in which currents flowing through the commonly used switching element upon operation of the boost converter and upon operation of the buck converter in directions cancelling each other, and means for detecting the state of the load circuit, the control circuit receiving an output from the load state detecting means to have the operation of the switching elements varied in accordance with a lowering in a load resistance of the load circuit.

2. The power device according to claim 1 wherein the control circuit controls the operation of the switching elements to be varied so as to provide a period in which, upon a short-circuit operation in a state where the lowering in the load resistance is detected by the load state detecting means, an energy accumulated in the second inductor is discharged with such first and second closed circuits as follows formed:

(a) the first closed circuit being formed, in an event where the polarity of the AC power source on the side of the node of the first and second switching elements is negative, through the second switching element, fourth switching element, second inductor and load circuit, and (b) the second closed circuit being formed, in an event where the polarity of the AC power source of the side of the node of the first and second switching element is positive, through the first switching element, third switching element, second inductor and load circuit.

3. The power device according to claim 1 wherein the control circuit controls the operation of the switching elements to be varied, upon a short-circuit operation in a state where the lowering in the load resistance is detected by the load state detecting means, through such first and second controls as follows:

(A) the first control being performed, in an event when the polarity of the AC power source on the side of the node of the first and second switching elements is negative, in the sequence of a period in which the second and third switching elements are turned ON, a period in which the second switching element only is turned ON, and a period in which the first through fourth switching elements are all turned OFF, and (B) the second control being performed, in an event when the polarity of the AC power source on the side of the junction point of the first and second switching elements is positive, in the sequence of a period in which the first and fourth switching elements are turned ON, a period in which the first switching element only is turned ON, and a period in which the first through fourth switching elements are all turned OFF.

4. The power device according to claim 3 wherein the control circuit controls the operation of the switching elements to be varied, in steady state in a state where the lowering in the load resistance is not detected by the load state detecting means, through such third and fourth controls as follows:

(C) the third control being performed, in an event when the polarity of the AC power source on the side of the node of the first and second switching elements is negative, in the sequence of a period in which the second and third switching elements are turned ON, a period in which the first and third switching elements are turned ON, and a period in which the first to fourth switching elements are all turned OFF, and (D) the fourth control being performed, in an event when the polarity of the AC power source on the side of the node of the first and second switching elements is positive, in the sequence of a period in which the first and fourth switching elements are turned ON, a period in which the second and fourth switching elements are turned ON, and a period in which the first to fourth switching elements are all turned OFF.

5. The power device according to claim 3 wherein the control circuit performs the control in accordance with the lowering in the load resistance detected by the load state detecting means, so as to render, in the first control (A), the period in which the second and third switching elements are turned ON to be shorter, and, in the second control (B), the period in which the first and fourth switching elements are turned ON to be shorter.

6. The power device according to claim 3 wherein the control circuit performs the control in accordance with the lowering in the load resistance detected by the load state detecting means, so as to render, in the first control (A), the period in which only the second switching element is turned ON to be longer, and, in the second control (B), the period in which the first switching element is turned ON to be longer.

7. The power device according to claim 3 wherein the control circuit performs the control in accordance with the lowering in the load resistance detected by the load state detecting means, in a direction of rendering the cycle of the first control (A) to be longer, and in a direction of rendering the cycle of the second control (B) to be longer.

8. The power device according to claim 1 wherein the control circuit performs the control so as to select, upon detection by the load state detecting means of a voltage across the smoothing capacitor to be below a predetermined comparison voltage, a steady mode for carrying out such fifth control as follows for varying the operation of the switching elements at a higher frequency than that of the AC power source, or, upon detection of the voltage across the smoothing capacitor to be above the predetermined comparison voltage, a low-impedance mode for carrying out such sixth control as follows for varying the operation of the switching elements at a higher frequency than that of the AC power source:

(E) the fifth control being performed, in the event of the negative polarity of the AC power source on the side of the junction point of the first and second switching elements, in the sequence of a period in which the second and third switching elements are made ON and the first and fourth switching elements are made OFF, a period in which the first and third switching elements are made ON and the second and fourth switching elements are made OFF, and, in the event of the positive polarity, in the sequence of a period in which the first and fourth switching elements are made ON and the second and third switching elements are made OFF, and a period in which the second and fourth switching elements are made ON and the first and third switching elements are made OFF, and (F) the sixth control being performed, in the event of the negative polarity of the AC power source on the side of the junction point of the first and second switching elements, in the sequence of a period in which the second and third switching elements are made ON and the first and fourth switching elements are made OFF, and a period in which the second and fourth switching elements are made ON and the first and third switching elements are made OFF, and, in the event of the positive polarity, in the sequence of a period in which the first and fourth switching elements are made ON and the second and third switching elements are made OFF, and a period in which the first and third switching elements are made ON and the second and fourth switching elements are made OFF.

9. The power device according to claim 8 which further comprises a steady mode controlling circuit for regulating the state of the fifth control in the event where the steady mode is selected, to regulate such period as in the following in a direction of reducing any differnece of the voltage across the smoothing capacitor from a reference voltage set lower than the comparison voltage, the period being, in the event of the negative polarity of the AC power source on the side of the node of the first and second elements, one in which the first and third switching elements are made ON and the second and fourth switching elements are made OFF, and, in the event of the positive polarity, one in which the second and fourth switching elements are made ON and the first and third switching elements are made OFF.

* * * * *

UNITED STATES PATENT AND TRADEMARK OFFICE
CERTIFICATE OF CORRECTION

PATENT NO. : 6,108,225
DATED : August 22, 2000
INVENTOR(S) : Yutaka Iwahori et al.

It is certified that error appears in the above-identified patent and that said Letters Patent is hereby corrected as shown below:

Delete "[*] Notice: This patent issued on continued prosecution application filed under 37 C.F.R. § 1.53(d), and is subject to the twenty year patent term provisions of 35 U.S.C. 154(a)(2)."

Signed and Sealed this

Twenty-third Day of October, 2001

*Attest:*

NICHOLAS P. GODICI
*Attesting Officer*    *Acting Director of the United States Patent and Trademark Office*